(12) United States Patent
Hwang et al.

(10) Patent No.: US 12,302,308 B2
(45) Date of Patent: May 13, 2025

(54) METHOD FOR TRANSMITTING AND RECEIVING INTER-UE COORDINATION INFORMATION IN A WIRELESS COMMUNICATION SYSTEM AND APPARATUS THEREFOR

(71) Applicant: LG ELECTRONICS INC., Seoul (KR)

(72) Inventors: Daesung Hwang, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 462 days.

(21) Appl. No.: 17/946,589

(22) Filed: Sep. 16, 2022

(65) Prior Publication Data

US 2023/0137259 A1    May 4, 2023

(30) Foreign Application Priority Data

Sep. 17, 2021   (KR) .......................... 1020210125182

(51) Int. Cl.
*H04W 72/121* (2023.01)
*H04W 72/20* (2023.01)
*H04W 72/25* (2023.01)

(52) U.S. Cl.
CPC ......... *H04W 72/121* (2013.01); *H04W 72/20* (2023.01); *H04W 72/25* (2023.01)

(58) Field of Classification Search
CPC ... H04W 4/08; H04W 4/40–48; H04W 72/02; H04W 72/04; H04W 72/12;

(Continued)

(56) References Cited

U.S. PATENT DOCUMENTS 11,683,787 B2 * 6/2023 Li .......................... H04W 72/02
370/329
2020/0288486 A1 9/2020 Kwak et al.
(Continued)

FOREIGN PATENT DOCUMENTS

WO   WO-2021088486 A1 *  5/2021

OTHER PUBLICATIONS

Liu et al., "Method Executed By User Equipment and User Equipment," English machine translation of WO 2021/088486, Clarivate Analyitcs, pp. 1-29 (Year: 2025).*

(Continued)

*Primary Examiner* — Thomas R Cairns
(74) *Attorney, Agent, or Firm* — BRYAN CAVE LEIGHTON PAISNER LLP

(57) ABSTRACT

A method of transmitting inter-UE coordination information by a first UE in a wireless communication system according to an embodiment of the present disclosure includes receiving first sidelink control information (SCI) including a request for inter-UE coordination information from a second UE, and transmitting second SCI including the inter-device coordination information to the second UE. In the same resource pool, a first payload size of the first SCI and a second payload size of the second SCI are the same based on based on the first SCI being transmitted on a first Physical Sidelink Shared Channel (PSSCH) and the second SCI being transmitted on a second PSSCH.

17 Claims, 17 Drawing Sheets

(58) Field of Classification Search
CPC ... H04W 72/121; H04W 72/20; H04W 72/25; H04W 72/40; H04W 92/18
See application file for complete search history.

(56) References Cited

U.S. PATENT DOCUMENTS

2022/0322302 A1* 10/2022 Park ............... H04W 72/20
2022/0377726 A1* 11/2022 Son ............... H04W 72/20

OTHER PUBLICATIONS

Spreadtrum Communications, "Discussion on inter-UE coordination in sidelink resource allocation", 3GPP TSG RAN WG1 #106-e, Aug. 16-27, 2021, R1-2106715.

LG Electronics, "Discussion on inter-UE coordination for Mode 2 enhancements", 3GPP TSG RAN WG1 Meeting #106-e, Aug. 16-27, 2021, R1-2107529.

Intel Corporation, "Design for Inter-UE Coordination Solutions for Sidelink Communication", 3GPP TSG RAN WG1 #106-e, Aug. 16-27, 2021, R1-2107610.

Oppo, "Discussion on resource allocation enhancement", 3GPP TSG-RAN WG2 #115-e, Aug. 2021, R2-2107042.

\* cited by examiner

● : Tx UE
◎ : Rx UE

METHOD FOR TRANSMITTING AND RECEIVING INTER-UE COORDINATION INFORMATION IN A WIRELESS COMMUNICATION SYSTEM AND APPARATUS THEREFOR

This application claims priority to Korean Patent Application No. 10-2021-0125182 filed on Sep. 17, 2021, the contents of which is hereby incorporated by reference herein in its entirety.

BACKGROUND OF INVENTION

Field of the Invention

The present disclosure relates to a method of transmitting and receiving inter-UE coordination information in a wireless communication system and a device thereof.

Related Art

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

As a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

Regarding an inter-UE coordination mechanism, two schemes may be considered. In scheme 1, a UE-A may provide a UE-B with a set of resources that can be used for a resource (re) selection procedure of the UE-B. In scheme 2, a UE-A may provide a UE-B with resource collision related information for resources indicated by sidelink control information (SCI) of the UE-B. The UE-B may avoid a resource collision by reselecting some of the resources indicated by the SCI of the UE-B.

In the scheme 1, the UE-B may transmit a request for inter-UE coordination information to the UE-A. The UE-A receiving the request may transmit the inter-UE coordination information to the UE-B. At this time, the request and the inter-UE coordination information may be transmitted based on second SCI (i.e., second stage SCI). Meanwhile, the format of the second stage SCI may be indicated by first SCI (first stage SCI) transmitted on a physical sidelink control channel (PSCCH). Specifically, the format of the second SCI may be indicated by a 2nd-stage SCI format field (2 bits) of the first stage SCI.

SUMMARY

A UE can monitor a limited number of SCI format sizes. More specifically, the maximum number of SCI format sizes that can be monitored by a UE is limited in terms of UE implementation. When a request for inter-UE coordination information and the inter-UE coordination information are transmitted or received based on the second SCI, the number of SCI format sizes that need to be supported by a UE increases, which increases UE implementation complexity.

In addition, second SCI formats are indicated by a field of first stage SCI having a limited number of bits (e.g., 2 bits). The maximum number of second SCI formats supported/indicated by a UE is 4. When second SCI for a request for inter-UE coordination information and second SCI for the inter-UE coordination information are added in separate formats, introduction of a new second SCI format may be restricted thereafter. In addition, when second SCI for a request for inter-UE coordination information and second SCI for the inter-UE coordination information are additionally added in the same format, it is impossible to distinguish whether corresponding second SCI is for the inter-UE coordination information or for the request for the inter-UE coordination information.

An object of the present disclosure is to propose a method of solving the above-described problem in signaling of inter-UE coordination information.

Objects of the present disclosure are not limited to the foregoing, and other unmentioned objects would be apparent to one of ordinary skill in the art from the following description.

A method of transmitting inter-UE coordination information by a first UE in a wireless communication system according to an embodiment of the present disclosure includes receiving first sidelink control information (SCI) including a request for inter-UE coordination information from a second UE, and transmitting second SCI including the inter-UE coordination information to the second UE.

In the same resource pool, a first payload size of the first SCI may be the same as a second payload size of the second SCI based on the first SCI being transmitted on a first physical sidelink shared channel (PSSCH) and the second SCI being transmitted on a second PSSCH.

The first payload size and the second payload size may be set to be identical based on appending of padding bits.

The padding bits may be appended based on the first payload size or the second payload size.

The padding bits may be appended to the first SCI based on the second payload size.

The padding bits may be appended to the second SCI based on the first payload size.

The padding bits may be based on a bit set to 0.

The first SCI may include detailed information related to the inter-UE coordination information, and the detailed information may include information related to at least one of i) priority, ii) a resource selection window, iii) the number of subchannels, and iv) a resource type.

The resource type may be based on a preferred resource or a non-preferred resource.

A resource pool related to the request may be the same as a resource pool related to the inter-UE coordination information.

A resource pool to which a preferred resource or a non-preferred resource related to the request belongs may be the same as a resource pool to which a preferred resource or a non-preferred resource related to the inter-UE coordination information belongs.

The first SCI and the second SCI may have the same format.

The first SCI may be received based on the first PSSCH scheduled by a first stage SCI related to a first physical sidelink control channel (PSCCH). The second SCI may be transmitted based on the second PSSCH scheduled by a first stage SCI related to the second PSCCH.

A first UE transmitting inter-UE coordination information in a wireless communication system according to another embodiment of the present disclosure includes one or more transceivers, one or more processors configured to control the one or more transceivers, and one or more memories operatively connected to one or more processors.

The one or more memories may store instructions for performing operations based on being executed by the one or more processors.

The operations may include receiving first sidelink control information (SCI) including a request for inter-UE coordination information from a second UE and transmitting second SCI including the inter-UE coordination information to the second UE.

In the same resource pool, a first payload size of the first SCI may be the same as a second payload size of the second SCI based on the first SCI being transmitted on a first physical sidelink shared channel (PSSCH) and the second SCI being transmitted on a second PSSCH.

A device for controlling a first UE to transmit inter-UE coordination information in a wireless communication system according to another embodiment of the present disclosure includes one or more processors and one or more memories operatively connected to one or more processors.

The one or more memories may store instructions for performing operations based on being executed by the one or more processors.

The operations may include receiving first sidelink control information (SCI) including a request for inter-UE coordination information from a second UE and transmitting second SCI including the inter-UE coordination information to the second UE.

In the same resource pool, a first payload size of the first SCI may be the same as a second payload size of the second SCI based on the first SCI being transmitted on a first physical sidelink shared channel (PSSCH) and the second SCI being transmitted on a second PSSCH.

One or more non-transitory computer-readable media according to another embodiment of the present disclosure store one or more instructions.

The one or more instructions perform operations based on being executed by one or more processors.

The operations may include receiving first sidelink control information (SCI) including a request for inter-UE coordination information from a second UE and transmitting second SCI including the inter-UE coordination information to the second UE.

In the same resource pool, a first payload size of the first SCI may be the same as a second payload size of the second SCI based on the first SCI being transmitted on a first physical sidelink shared channel (PSSCH) and the second SCI being transmitted on a second PSSCH.

A method of receiving inter-UE coordination information by a second UE in a wireless communication system according to another embodiment of the present disclosure includes transmitting first SCI including a request for inter-UE coordination information to a first UE and receiving second SCI including the inter-UE coordination information from the first UE.

In the same resource pool, a first payload size of the first SCI may be the same as a second payload size of the second SCI based on the first SCI being transmitted on a first physical sidelink shared channel (PSSCH) and the second SCI being transmitted on a second PSSCH.

A second UE receiving inter-UE coordination information in a wireless communication system according to another embodiment of the present disclosure includes one or more transceivers, one or more processors configured to control the one or more transceivers, and one or more memories operatively connected to the one or more processors.

A second UE receiving inter-UE coordination information in a wireless communication system according to another embodiment of the present disclosure includes one or more transceivers, one or more processors configured to control the one or more transceivers, and one or more memories operatively connected to the one or more processors.

The one or more memories may store instructions for performing operations, based on being executed by the one or more processors.

The operations may include transmitting first SCI including a request for inter-UE coordination information to a first UE and receiving second SCI including the inter-UE coordination information from the first UE.

In the same resource pool, a first payload size of the first SCI may be the same as a second payload size of the second SCI based on the first SCI being transmitted on a first physical sidelink shared channel (PSSCH) and the second SCI being transmitted on a second PSSCH.

According to an embodiment of the present disclosure, based on the fact that a request for inter-UE coordination information and the inter-UE coordination information are related to second stage SCI transmitted on a PSSCH, the second stage SCI includes an indicator indicating i) the request or ii) the inter-UE coordination information. Accordingly, signaling of the request for inter-UE coordination information and the inter-UE coordination information can be performed based on the same second SCI format. That is, it is possible to minimize restrictions on introduction of a new second SCI format that occurs as the second stage SCI is used as a container of the request and the inter-UE coordination information.

In addition, according to an embodiment of the present disclosure, a first payload size of first SCI related to a request for inter-UE coordination information is the same as a second payload size of second SCI related to the inter-UE coordination information. Therefore, UE implementation complexity can be reduced as compared to compared to cases in which two different second SCI format sizes are used.

Effects of the present disclosure are not limited to the foregoing, and other unmentioned effects would be apparent to one of ordinary skill in the art from the following description.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

DESCRIPTION OF EXEMPLARY EMBODIMENTS

Figure 1:
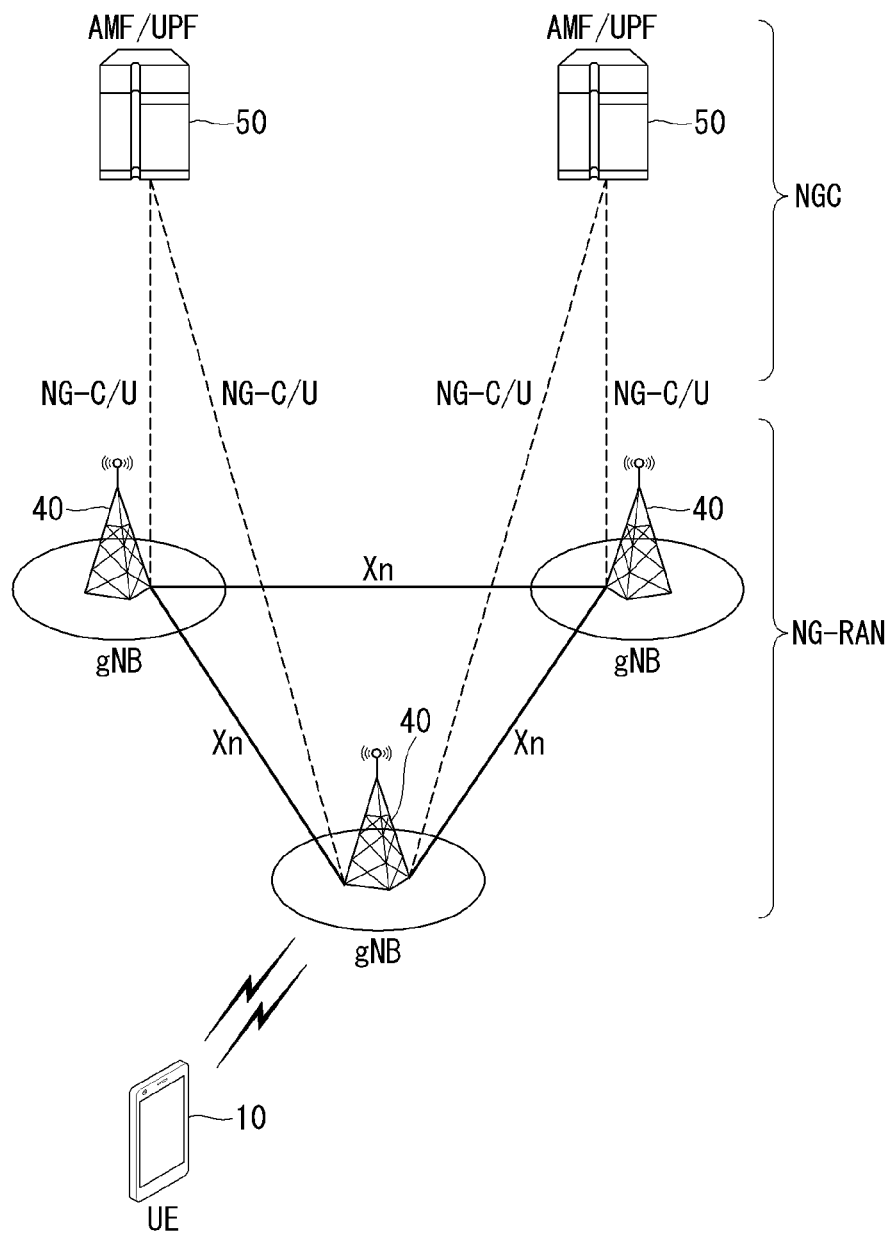
FIG. 1 shows a structure of an NR system, based on an embodiment of the present disclosure.

In various embodiments of the present disclosure, "/" and "," should be interpreted as representing "and/or". For example, "A/B" may mean "A and/or B". Furthermore, "A, B" may mean "A and/or B". Furthermore, "A/B/C" may mean "at least one of A, B, and/or C". Furthermore, "A, B, C" may mean "at least one of A, B, and/or C".

In various embodiments of the present disclosure, "or" should be interpreted as representing "and/or". For example, "A or B" may include "only A", "only B", and/or "both A and B". In other words, "or" should be interpreted as representing "additionally" or "alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features based on an embodiment of the present disclosure will not be limited only to this.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QOS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (physical layer or PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

FIG. 1 shows a structure of an NR system, based on an embodiment of the present disclosure.

Referring to FIG. 1, a Next Generation-Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 2:
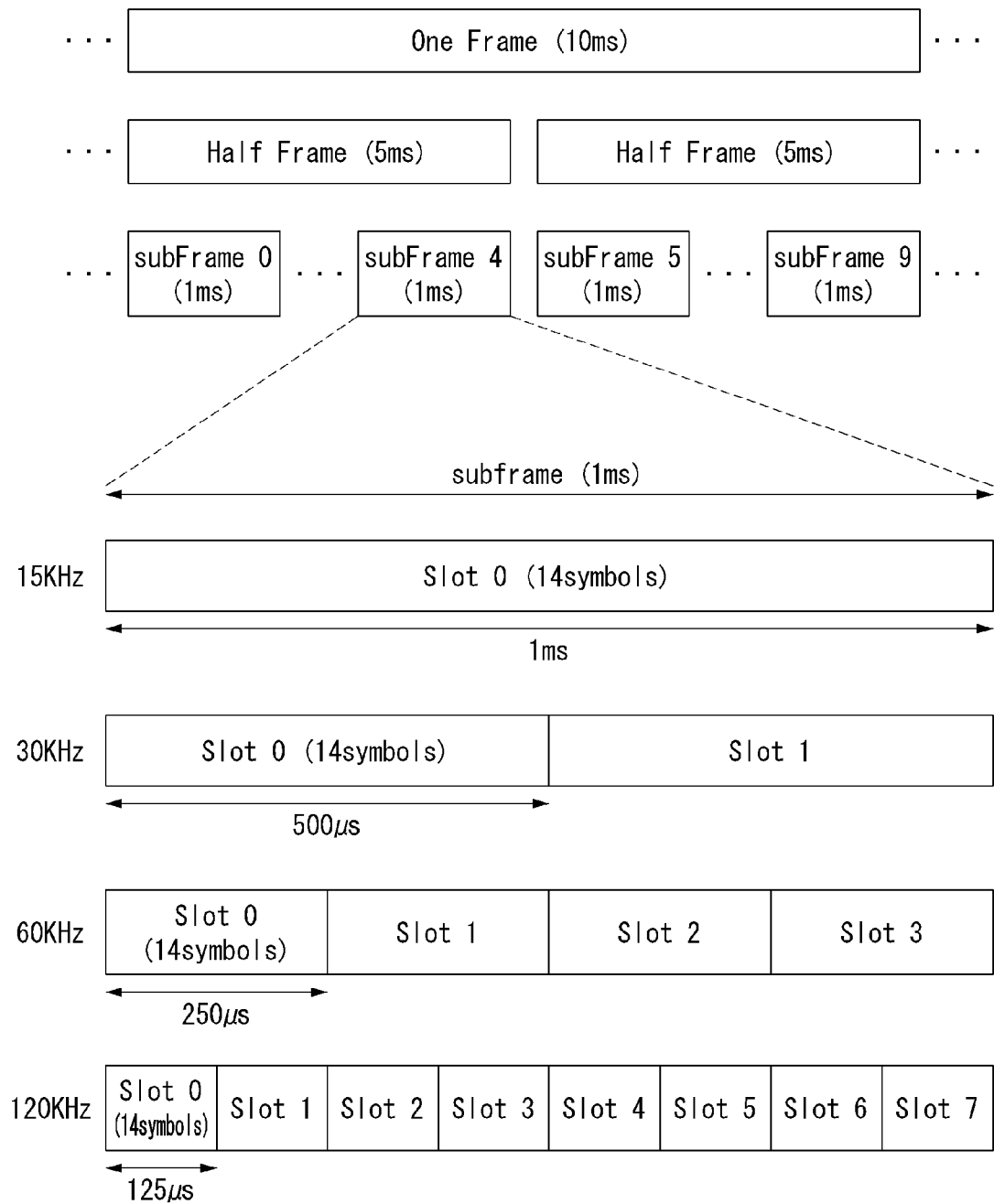
FIG. 2 shows a structure of a radio frame of an NR, based on an embodiment of the present disclosure.

FIG. 2 shows a structure of a radio frame of an NR, based on an embodiment of the present disclosure.

Referring to FIG. 2, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM (A) symbols based on a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

In an NR system, OFDM (A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 3:
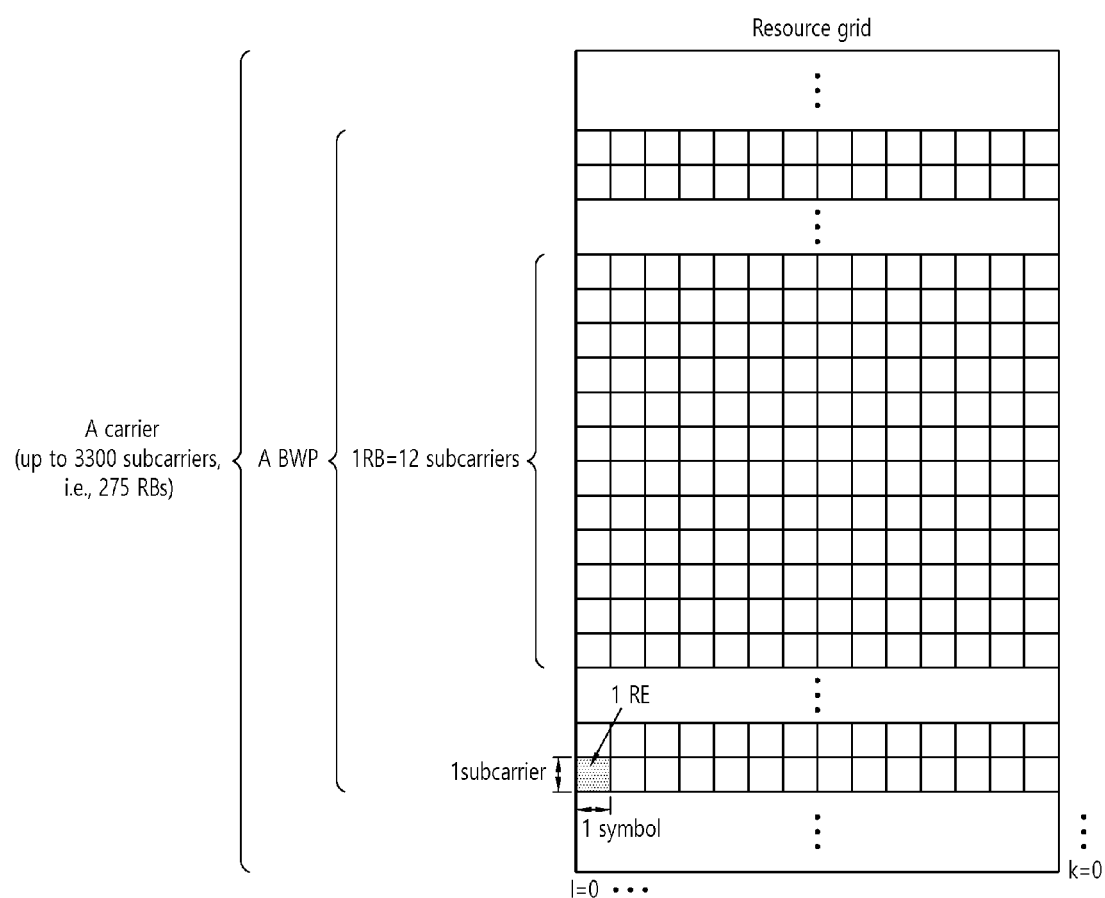
FIG. 3 shows a structure of a slot of an NR frame, based on an embodiment of the present disclosure.

FIG. 3 shows a structure of a slot of an NR frame, based on an embodiment of the present disclosure.

Referring to FIG. 3, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

A radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Sidelink Synchronization Signal (SLSS) and Synchronization Information

The SLSS may be an SL-specific sequence and include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and/or for synchronization acquisition. For example, the UE may use the S-PSS and the S-SSS for acquisition of fine synchronization and/or for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-) configured. Accordingly, the UE does not have to perform hypothesis detection at frequency to discover the S-SSB in the carrier.

A plurality of numerologies having different SCSs and/or CP lengths may be supported in an NR SL system. In this case, a length of a time resource used by a transmitting UE to transmit the S-SSB may be decreased along with an increase in the SCS. Accordingly, coverage of the S-SSB may be decreased. Therefore, in order to ensure the coverage of the S-SSB, the transmitting UE may transmit one or more S-SSBs to a receiving UE within one S-SSB transmission period based on the SCS. For example, the number of S-SSBs transmitted by the transmitting UE to the receiving UE within one S-SSB transmission period may be pre-configured or configured to the transmitting UE. For example, an S-SSB transmission period may be 160 ms. For example, the S-SSB transmission period of 160 ms may be supported for all SCSs.

For example, if the SCS is 15 kHz in FR1, the transmitting UE may transmit 1 or 2 S-SSBs to the receiving UE within one S-SSB transmission period. For example, if the SCS is 30 kHz in FR1, the transmitting UE may transmit 1 or 2 S-SSBs to the receiving UE within one S-SSB transmission period. For example, if the SCS is 60 kHz in FR1, the transmitting UE may transmit 1, 2, or 4 S-SSBs to the receiving UE within one S-SSB transmission period.

For example, if the SCS is 60 kHz in FR2, the transmitting UE may transmit 1, 2, 4, 8, 16, or 32 S-SSBs to the receiving UE within one S-SSB transmission period. For example, if the SCS is 120 kHz in FR2, the transmitting UE may transmit 1, 2, 4, 8, 16, 32, or 64 S-SSBs to the receiving UE within one S-SSB transmission period.

If the SCS is 60 kHz, two types of CP may be supported. In addition, a structure of an S-SSB transmitted by the transmitting UE to the receiving UE may differ depending on a CP type. For example, the CP type may be normal CP (NCP) or extended CP (ECP). Specifically, for example, if the CP type is the NCP, the number of symbols for mapping a PSBCH within an S-SSB transmitted by the transmitting UE may be 9 or 8. Otherwise, for example, if the CP type is the ECP, the number of symbols for mapping the PSBCH within the S-SSB transmitted by the transmitting UE may be 7 or 6. For example, the PSBCH may be mapped to a first/initial symbol within the S-SSB transmitted by the transmitting UE. For example, the receiving UE which receives the S-SSB may perform an automatic gain control (AGC) operation in a first/initial symbol duration of the S-SSB.

Figure 4:
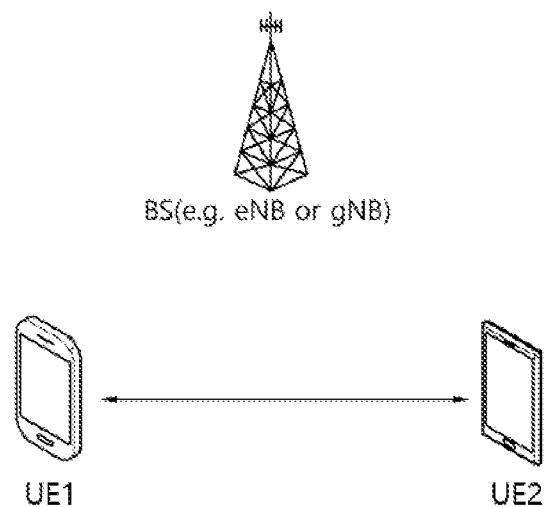
FIG. 4 shows a UE performing V2X or SL communication based on an embodiment of the present disclosure.

FIG. 4 shows a UE performing V2X or SL communication based on an embodiment of the present disclosure.

Referring to FIG. 4, in V2X or SL communication, the term 'UE' may generally imply a UE of a user. However, if a network equipment such as a BS transmits/receives a signal based on a communication scheme between UEs, the BS may also be regarded as a sort of the UE. For example, a UE 1 may be a first device 100, and a UE 2 may be a second device 200.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

Figure 5:
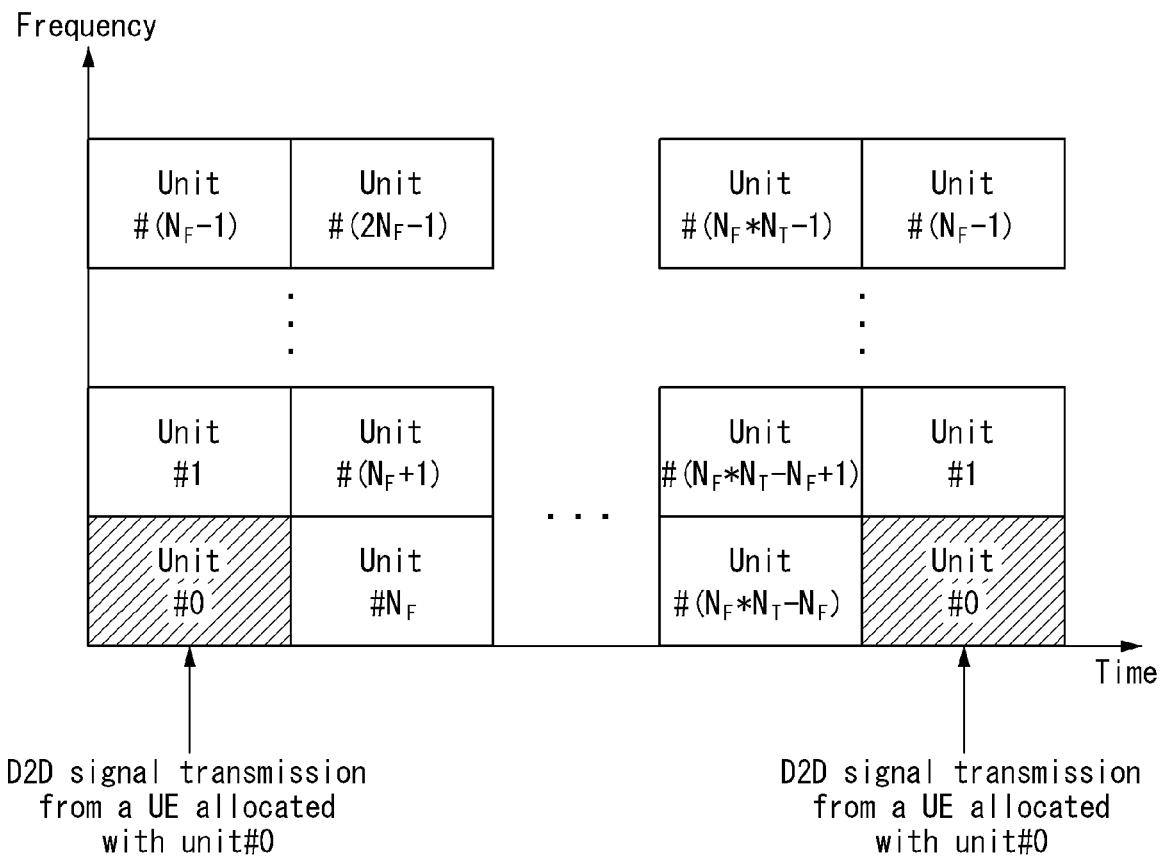
FIG. 5 shows a resource unit for V2X or SL communication based on an embodiment of the present disclosure.

FIG. 5 shows a resource unit for V2X or SL communication based on an embodiment of the present disclosure.

Referring to FIG. 5, all frequency resources of a resource pool may be divided into NF resources, and all time resources of the resource pool may be divided into NT resources. Therefore, NF*NT resource units may be defined in the resource pool. FIG. 5 may show an example of a case where a corresponding resource pool is repeated with a period of NT subframes.

As shown in FIG. 5, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

(2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Resource Allocation in SL

Figure 6:
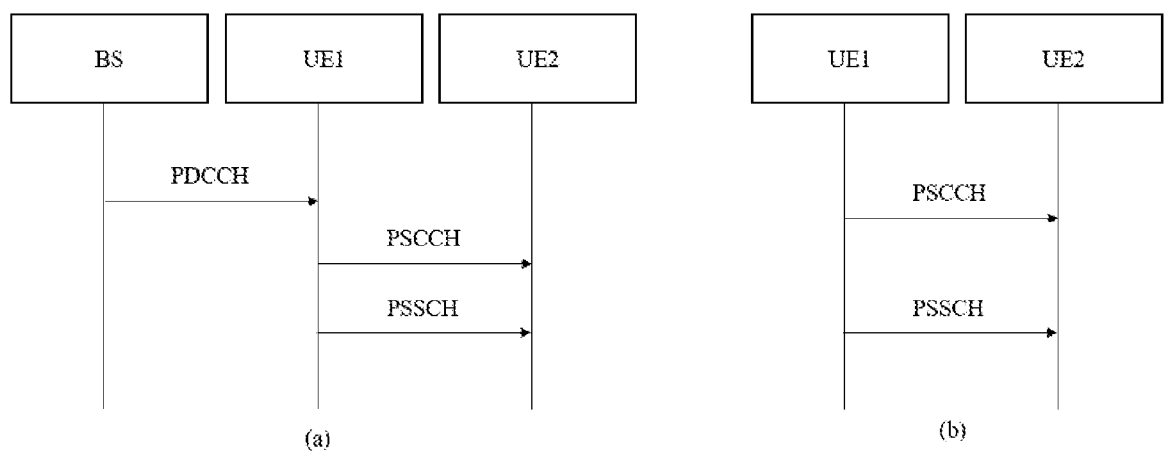
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. In various embodiments of the present disclosure, the transmission mode may be referred to as a mode or a resource allocation mode. Hereinafter, for convenience of explanation, in LTE, the transmission mode may be referred to as an LTE transmission mode. In NR, the transmission mode may be referred to as an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 based on the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

For example, in the NR resource allocation mode 1, the UE may be provided or allocated with one or more SL transmission resources of one transport block (TB) from the BS through a dynamic grant. For example, the BS may provide the UE with resource for PSCCH and/or PSSCH transmission based on the dynamic grant. For example, a transmitting UE may report to the BS an SL hybrid automatic repeat request (HARQ) feedback received from a receiving UE. In this case, based on an indication within a PDCCH used by the BS to allocate a resource for SL transmission, a PUCCH resource and timing for reporting an SL HARQ feedback to the BS may be determined.

For example, DCI may include information related to a slot offset between DCI reception and first/initial SL transmission scheduled by the DCI. For example, a minimum gap between the DCI for scheduling the SL transmission resource and a first scheduled SL transmission resource may be not less than a processing time of a corresponding UE.

For example, in the NR resource allocation mode 1, for multiple SL transmissions, the UE may be periodically provided or allocated with a resource set from the BS through a configured grant. For example, the configured grant may include a configured grant type 1 or a configured grant type 2. For example, the UE may determine a TB to be transmitted in each of occasions indicated by a given configured grant.

For example, the BS may allocate an SL resource to the UE on the same carrier, or may allocate the SL resource to the UE on a different carrier.

For example, an NR BS may control LTE-based SL communication. For example, the NR BS may transmit NR DCI to the UE to schedule an LTE SL resource. In this case, for example, a new RNTI may be defined to scramble the NR DCI. For example, the UE may include an NR SL module and an LTE SL module.

For example, after the UE including the NR SL module and the LTE SL module receives NR SL DCI from a gNB, the NR SL module may convert the NR SL DCI to an LTE DCI type 5A, and the NR SL module may transfer the LTE DCI type 5A to the LTE SL module in unit of X ms. For example, after the LTE SL module receives the LTE DCI format 5A from the NR SL module, the LTE SL module may apply activation and/or release in a first/initial LTE subframe after Z ms. For example, the X may be dynamically indicated by using a field of DCI. For example, a minimum value of the X may differ depending on UE capability. For example, the UE may report a single value depending on the UE capability. For example, the X may be a positive number.

Referring to (b) of FIG. 6, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selection window by performing a sensing and resource (re) selection procedure. For example, the sensing may be performed in unit of sub-channels. In addition, the UE 1 which has autonomously selected the resource within the resource pool may transmit the SCI to the UE 2 through a PSCCH, and thereafter may transmit data based on the SCI to the UE 2 through a PSSCH.

A re-evaluation operation may be performed for the resource (re) selection. Immediately before performing a transfer on a reserved resource, the corresponding UE re-evaluates a set of resources, that the UE can select, in order to check whether a transmission intended by the UE is still suitable. Based on the sensing result, the re-evaluation may be performed on a slot based on a preset value T3. For example, the re-evaluation operation may be performed in a previous slot (e.g., m-T3) of a slot (m) in which SCI representing the reserved resource(s) is first signaled.

The preset value T3 may be related to pre-emption and/or re-evaluation for SL resource. Specifically, the UE may perform an operation related to pre-emption and/or re-evaluation based on Table 5 below.

TABLE 5

A resource(s) of the selected sidelink grant for a MAC PDU to transmit from multiplexing and assembly entity is re-evaluated by physical layer at $T_3$ before the slot where the SCI indicating the resource(s) is signalled at first time as specified in clause 8.1.4 of TS 38.214 [7].

A resource(s) of the selected sidelink grant which has been indicated by a prior SCI for a MAC PDU to transmit from multiplexing and assembly entity could be checked for pre-emption by physical layer at $T_3$ before the slot where the resource(s) is located as specified in clause 8.1.4 of TS 38.214 [7].

NOTE 1: It is up to UE implementation to re-evaluate or pre-empt before 'm-$T_3$' or after 'm-$T_3$' but before 'm'. For re-evaluation, m is the slot where the SCI indicating the resource(s) is signalled at first time as specified in clause 8.1.4 of TS 38.214. For pre-emption, m is the slot where the resource(s) is located as specified in clause 8.1.4 of TS 38.214.

TABLE 5-continued

If the MAC entity has been configured with Sidelink resource allocation mode 2 to transmit using pool(s) of
resources in a carrier as indicated in TS 38.331 [5] or TS 36.331 [21] based on sensing or random selection the
MAC entity shall for each Sidelink process:
- 1> if a resource(s) of the selected sidelink grant which has not been identified by a prior SCI is indicated for re-evaluation by the physical layer as specified in clause 8.1.4 of TS 38.214 [7]; or
- 1> if any resource(s) of the selected sidelink grant which has been indicated by a prior SCI is indicated for pre-emption by the physical layer as specified in clause 8.1.4 of TS 38.214 [7]:
  - 2> remove the resource(s) from the selected sidelink grant associated to the Sidelink process;
  - 2> randomly select the time and frequency resource from the resources indicated by the physical layer as specified in clause 8.1.4 of TS 38.214 [7] for either the removed resource or the dropped resource, according to the amount of selected frequency resources, the selected number of HARQ retransmissions and the remaining PDB of either SL data available in the logical channel(s) by ensuring the minimum time gap between any two selected resources of the selected sidelink grant in case that PSFCH is configured for this pool of resources, and that a resource can be indicated by the time resource assignment of a SCI for a retransmission according to clause 8.3.1.1 of TS 38.212 [9];
- NOTE 2: If retransmission resource(s) cannot be selected by ensuring that the resource(s) can be indicated by the time resource assignment of a prior SCI, how to select the time and frequency resources for one or more transmission opportunities from the available resources is left for UE implementation by ensuring the minimum time gap between any two selected resources in case that PSFCH is configured for this pool of resources.
  - 2> replace the removed or dropped resource(s) by the selected resource(s) for the selected sidelink grant.
- NOTE 3: It is left for UE implementation to reselect any pre-selected but not reserved resource(s) other than the resource(s) indicated for pre-emption or re-evaluation by the physical layer during reselection triggered by re-evaluation or pre-emption indicated by the physical layer.
- NOTE 4: It is up to UE implementation whether to set the resource reservation interval in the re-selected resource to replace pre-empted resource.
- NOTE 5: It is up to UE implementation whether to trigger resource reselection due to deprioritization as specified in clause 16.2.4 of TS 38.213 [6], clause 5.14.1.2.2 of TS 36.321 [22] and clause 5.22.1.3.1a.
- NOTE 6: For the selected sidelink grant corresponds to transmissions of multiple MAC PDU, it is up to UE implementation whether to apply re-evaluation check to the resources in non-initial reservation period that have been signalled neither in the immediate last nor in the current period.

The preset value T3 may be set to the same value as a processing time (e.g., $T_{proc,1}^{SL}$) configured for the resource selection of the UE. The following Table 6 illustrates a processing time determined based on a subcarrier spacing configuration ($\mu_{SL}$) of a sidelink bandwidth (SL BWP). For example, the processing time ($T_{proc,1}^{SL}$) may be configured to determine a start point T1 of a resource selection window.

TABLE 6

| $\mu_{SL}$ | $T_{proc,1}^{SL}$ [slots] |
|---|---|
| 0 | 3 |
| 1 | 5 |
| 2 | 9 |
| 3 | 17 |

For example, the UE may assist the SL resource selection for another UE. For example, in the NR resource allocation mode 2, the UE may be provided/allocated with a configured grant for SL transmission. For example, in the NR resource allocation mode 2, the UE may schedule SL transmission of another UE. For example, in the NR resource allocation mode 2, the UE may reserve an SL resource for blind retransmission.

For example, in the NR resource allocation mode 2, the UE 1 may use the SCI to indicate a priority of SL transmission to the UE 2. For example, the UE 2 may decode the SCI, and the UE 2 may perform sensing and/or resource (re) selection on the basis of the priority. For example, the resource (re) selection procedure may include a step in which the UE 2 identifies a candidate resource in a resource selection window and a step in which the UE 2 selects a resource for (re) transmission among the identified candidate resources. For example, the resource selection window may be a time interval for selecting a resource for SL transmission by the UE. For example, after the UE 2 triggers resource (re) selection, the resource selection window may start at T1≥0, and the resource selection window may be restricted by a remaining packet delay budget of the UE 2. The T1 may be determined as a value less than or equal to the processing time (e.g., $T_{proc,1}^{SL}$ of the above Table 6) configured for the resource selection. For example, when a slot in which the resource (re) selection is triggered is n, the resource selection window may be determined as a time duration of n+T1 to n+T2. The T2 may denote the number of slots that is less than or equal to the number of slots corresponding to the remaining packet delay budget.

For example, in the step in which the UE 2 identifies the candidate resource in the resource selection window, if a specific resource is indicated by the SCI received by the UE 2 from the UE 1 and if an L1 SL RSRP threshold for the specific resource exceeds an SL RSRP threshold, the UE 2 may not determine the specific resource as the candidate resource. For example, the SL RSRP threshold may be determined based on a priority of SL transmission indicated by the SCI received by the UE 2 from the UE 1 and a priority of SL transmission on a resource selected by the UE 2.

For example, the L1 SL RSRP may be measured based on an SL demodulation reference signal (DMRS). For example, one or more PSSCH DMRS patterns may be configured or pre-configured in a time domain for each resource pool. For example, a PDSCH DMRS configuration type 1 and/or type 2 may be identical or similar to a frequency domain pattern of the PSSCH DMRS. For example, a correct DMRS pattern may be indicated by the SCI. For example, in the NR resource allocation mode 2, the transmitting UE may select a specific DMRS pattern from among configured or pre-configured DMRS patterns for the resource pool.

For example, in the NR resource allocation mode 2, the transmitting UE may perform initial transmission of a transport block (TB) without reservation, based on the sensing and resource (re) selection procedure. For example, the transmitting UE may use an SCI related to a first/initial RB to reserve an SL resource for initial transmission of a second TB, based on the sensing and resource (re) selection procedure.

For example, in the NR resource allocation mode 2, the UE may reserve a resource for feedback-based PSSCH retransmission, through signaling related to previous transmission of the same TB. For example, the maximum number of SL resources reserved by one transmission including current transmission may be 2, 3, or 4. For example, the maximum number of SL resources may be identical irrespective of whether HARQ feedback is enabled. For example, the maximum number of HARQ (re) transmissions for one TB may be restricted by a configuration or a pre-configuration. For example, the maximum number of HARQ (re) transmissions may be up to 32. For example, in the absence of the configuration or the pre-configuration, the maximum number of HARQ (re) transmissions may not be designated. For example, the configuration or the pre-configuration may be for the transmitting UE. For example, in the NR resource allocation mode 2, HARQ feedback for releasing a resource not used by the UE may be supported.

For example, in the NR resource allocation mode 2, the UE may use the SCI to indicate to another UE one or more sub-channels and/or slots used by the UE. For example, the UE may use the SCI to indicate to another UE one or more sub-channels and/or slots reserved by the UE for PSSCH (re) transmission. For example, a minimum allocation unit of an SL resource may be a slot. For example, a size of a sub-channel may be configured for the UE or may be pre-configured.

Sidelink Control Information (SCI)

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a 1st SCI, and an SCI including a second SCI configuration field group may be referred to as a second SCI or a 2nd SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

In various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE through the PSSCH, the PSSCH may be replaced/substituted with the second SCI.

Figure 7:
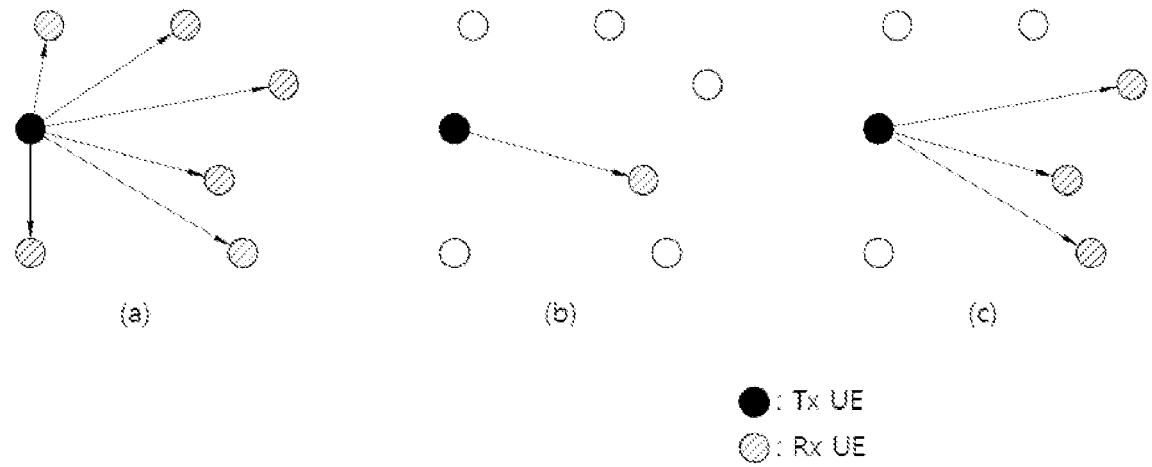
FIG. 7 shows three cast type based on an embodiment of the present disclosure.

FIG. 7 shows three cast types based on an embodiment of the present disclosure.

Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a cooperative awareness message (CAM) and a decentralized environmental notification message (DENM) will be described.

In vehicle-to-vehicle communication, a periodic message-type CAM, an event triggered message-type DENM, or the like may be transmitted. The CAM may include dynamic state information of the vehicle such as direction and speed, static data of the vehicle such as a size, and basic vehicle information such as an exterior illumination state, route details, or the like. A size of the CAM may be 50-300 bytes. The CAM is broadcast, and a latency shall be less than 100 ms. The DENM may be a message generated in an unexpected situation such as a vehicle breakdown, accident, or the like. A size of the DENM may be less than 3000 bytes, and all vehicles within a transmission range may receive a message. In this case, the DENM may have a higher priority than the CAM.

Hereinafter, carrier reselection will be described.

In V2X or SL communication, a UE may perform carrier reselection based on a channel busy ratio (CBR) of configured carriers and/or a ProSe per-packet priority (PPPP) of a V2X message to be transmitted. For example, the carrier reselection may be performed by a MAC layer of the UE. In various embodiments of the present disclosure, a ProSe per packet priority (PPPP) may be replaced with a ProSe per packet reliability (PPPR), and the PPPR may be replaced with the PPPP. For example, it may mean that the smaller the PPPP value, the higher the priority, and that the greater the PPPP value, the lower the priority. For example, it may mean that the smaller the PPPR value, the higher the reliability, and that the greater the PPPR value, the lower the reliability. For example, a PPPP value related to a service, packet, or message related to a high priority may be smaller than a PPPP value related to a service, packet, or message related to a low priority. For example, a PPPR value related to a service, packet, or message related to a high reliability may be smaller than a PPPR value related to a service, packet, or message related to a low reliability.

CBR may mean the portion of sub-channels in a resource pool in which a sidelink-received signal strength indicator (S-RSSI) measured by the UE is detected to be greater than a pre-configured threshold. There may be a PPPP related to each logical channel, and a configuration of the PPPP value shall reflect a latency required in both a UE and a BS. In carrier reselection, the UE may select one or more carriers from among candidate carriers starting from a lowest CBR in an ascending order of the CBR.

Hereinafter, an RRC connection establishment between UEs will be described.

For V2X or SL communication, a transmitting UE may need to establish a (PC5) RRC connection with a receiving UE. For example, the UE may obtain V2X-specific SIB. For a UE which is configured to transmit V2X or SL communication by a higher layer and which has data to be transmitted, if a frequency at which at least the UE is configured to transmit SL communication is included in the V2X-specific SIB, the UE may establish an RRC connection with another UE without including a transmission resource pool for the frequency. For example, if an RRC connection is established between the transmitting UE and the receiving UE, the transmitting UE may perform unicast communication with respect to the receiving UE through the established RRC connection.

When the RRC connection is established between the UEs, the transmitting UE may transmit an RRC message to the receiving UE.

The receiving UE may perform antenna/resource de-mapping, demodulation, and decoding for received information. The information may be transferred to the RRC layer via the MAC layer, the RLC layer, and the PDCP layer. Accordingly, the receiving UE may receive the RRC message generated by the transmitting UE.

V2X or SL communication may be supported for a UE of an RRC_CONNECTED mode, a UE of an RRC_IDLE mode, and a UE of an (NR) RRC_INACTIVE mode. That is, the UE of the RRC_CONNECTED mode, the UE of the RRC_IDLE mode, and the UE of the (NR) RRC_INACTIVE mode may perform V2X or SL communication. The UE of the RRC_INACTIVE mode or the UE of the RRC_IDLE mode may perform V2X or SL communication by using a cell-specific configuration included in V2X-specific SIB.

RRC may be used to exchange at least UE capability and AS layer configuration. For example, a UE 1 may transmit UE capability and AS layer configuration of the UE 1 to a UE 2, and the UE 1 may receive UE capability and AS layer configuration of the UE 2 from the UE 2. In case of UE capability transfer, an information flow may be triggered during or after PC5-S signaling for a direct link setup.

Hereinafter, SL radio link monitoring (RLM) will be described.

In case of AS-level link management of unicast, SL radio link monitoring (RLM) and/or radio link failure (RLF) declaration may be supported. In case of RLC acknowledged mode (AM) in SL unicast, the RLF declaration may be triggered by an indication from RLC indicating that the maximum number of retransmissions has been reached. An AS-level link status (e.g., failure) may need to be informed to a higher layer. Unlike the RLM procedure for unicast, a groupcast-related RLM design may not be considered. The RLM and/or RLF declarations may not be necessary between group members for groupcast.

For example, a transmitting UE may transmit a reference signal to a receiving UE, and the receiving UE may perform SL RLM by using the reference signal. For example, the receiving UE may declare SL RLF by using the reference signal. For example, the reference signal may be referred to as an SL reference signal.

Measurement and Reporting for SL

Hereinafter, SL measurement and reporting will be described.

For the purpose of QoS prediction, initial transmission parameter setting, link adaptation, link management, admission control, or the like, SL measurement and reporting (e.g., RSRP, RSRQ) between UEs may be considered in SL. For example, a receiving UE may receive a reference signal from a transmitting UE, and the receiving UE may measure a channel state for the transmitting UE based on the reference signal. In addition, the receiving UE may report channel state information (CSI) to the transmitting UE. SL-related measurement and reporting may include measurement and reporting of CBR and reporting of location information. Examples of channel status information (CSI) for V2X may include a channel quality indicator (CQI), a precoding matrix index (PM), a rank indicator (RI), reference signal received power (RSRP), reference signal received quality (RSRQ), pathgain/pathloss, a sounding reference symbol (SRS) resource indicator (SRI), a SRI-RS resource indicator (CRI), an interference condition, a vehicle motion, or the like. In case of unicast communication, CQI, RI, and PMI or some of them may be supported in a non-subband-based aperiodic CSI report under the assumption of four or less antenna ports. A CSI procedure may not be dependent on a standalone reference signal (RS). A CSI report may be activated or deactivated based on a configuration.

For example, the transmitting UE may transmit CSI-RS to the receiving UE, and the receiving UE may measure CQI or RI based on the CSI-RS. For example, the CSI-RS may be referred to as SL CSI-RS. For example, the CSI-RS may be confined within PSSCH transmission. For example, the transmitting UE may perform transmission to the receiving UE by including the CSI-RS on the PSSCH.

Hereinafter, physical layer processing will be described.

Based on an embodiment of the present disclosure, a data unit may be a target of physical layer processing in a transmitting side before being transmitted through a radio interface. Based on an embodiment of the present disclosure, a radio signal carrying the data unit may be a target of physical layer processing in a receiving side.

Table 7 may show a mapping relation between an uplink transport channel and a physical channel, and Table 8 may show a mapping relation between uplink control channel information and the physical channel.

TABLE 7

| Transport channel | Physical channel |
| --- | --- |
| UL-SCH (Uplink-Shared Channel) | PUSCH (Physical Uplink Shared Channel) |
| RACH (Random Access Channel) | PRACH (Physical Random Access Channel) |

TABLE 8

| Control information | Physical channel |
| --- | --- |
| UCI (Uplink Control Information) | PUCCH (Physical Uplink Control Channel) |
| | PUSCH (Physical Uplink Shared Channel) |

Table 9 may show a mapping relation between a downlink transport channel and a physical channel, and Table 10 may show a mapping relation between downlink control channel information and the physical channel.

TABLE 9

| Transport channel | Physical channel |
| --- | --- |
| DL-SCH (Downlink-Shared Channel) | PDSCH (Physical Downlink Shared Channel) |
| BCH (Broadcast Channel) | PBCH (Physical Broadcast Channel) |
| PCH (Paging Channel) | PDSCH (Physical Downlink Shared Channel) |

TABLE 10

| Control information | Physical channel |
| --- | --- |
| DCI (Downlink Control Information) | PDCCH (Physical Downlink Control Channel) |

Table 11 may show a mapping relation between an SL transport channel and a physical channel, and Table 12 may show a mapping relation between SL control channel information and the physical channel.

TABLE 11

| Transport channel | Physical channel |
| --- | --- |
| SL-SCH (Sidelink-Shared Channel) | PSSCH (Physical Sidelink Shared Channel) |
| SL-BCH (Sidelink-Broadcast Channel) | PSBCH (Physical Sidelink Broadcast Channel) |

TABLE 12

| Control information | Physical channel |
| --- | --- |
| SCI (Sidelink Control Information) | PSCCH (Physical Sidelink Control Channel) |

In the aforementioned physical layer processing of the transmitting/receiving side, time and frequency domain resources related to subcarrier mapping (e.g., an OFDM symbol, a subcarrier, a subcarrier frequency), OFDM modulation, and frequency up/down-conversion may be determined based on resource allocation (e.g., an uplink grant, downlink allocation).

Hybrid Automatic Repeat Request (HARQ) for SL

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Bandwidth Part and Resource Pool

Hereinafter, a bandwidth part (BWP) and a resource pool will be described.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

Figure 8:
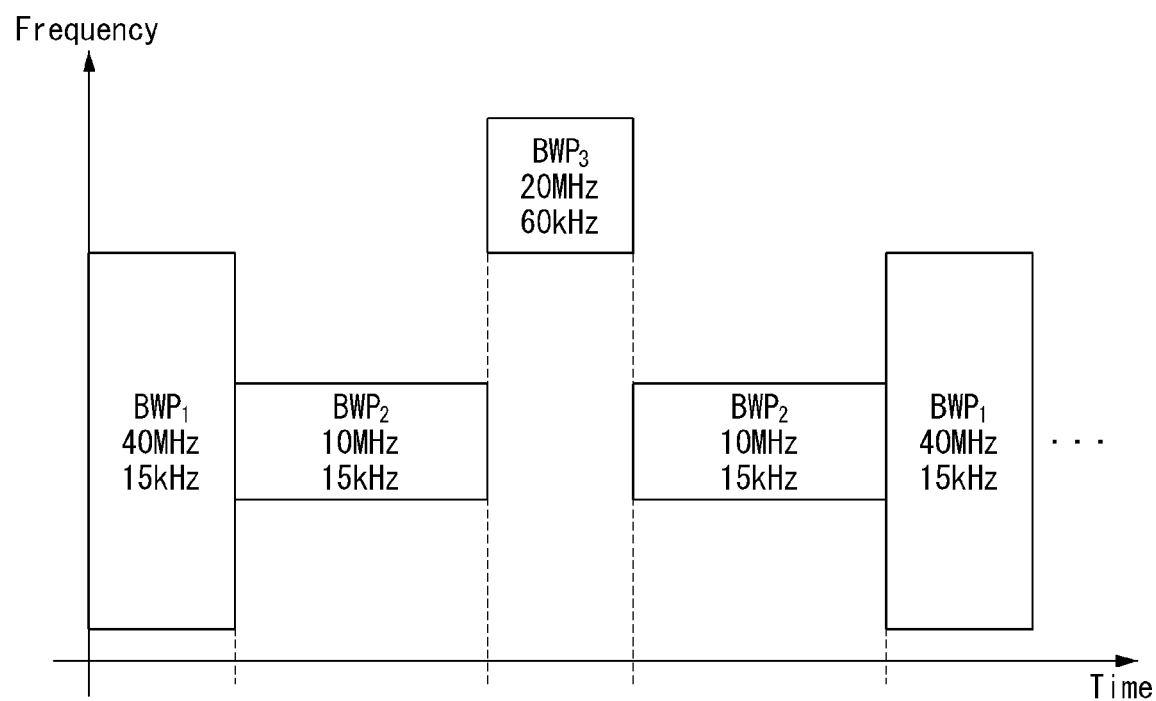
FIG. 8 shows a plurality of BWPs based on an embodiment of the present disclosure.

FIG. 8 shows a plurality of BWPs based on an embodiment of the present disclosure.

Referring to FIG. 8, a BWP1 having a bandwidth of 40 MHz and a subcarrier spacing of 15 kHz, a BWP2 having a bandwidth of 10 MHz and a subcarrier spacing of 15 kHz, and a BWP3 having a bandwidth of 20 MHz and a subcarrier spacing of 60 kHz may be configured.

Figure 9:
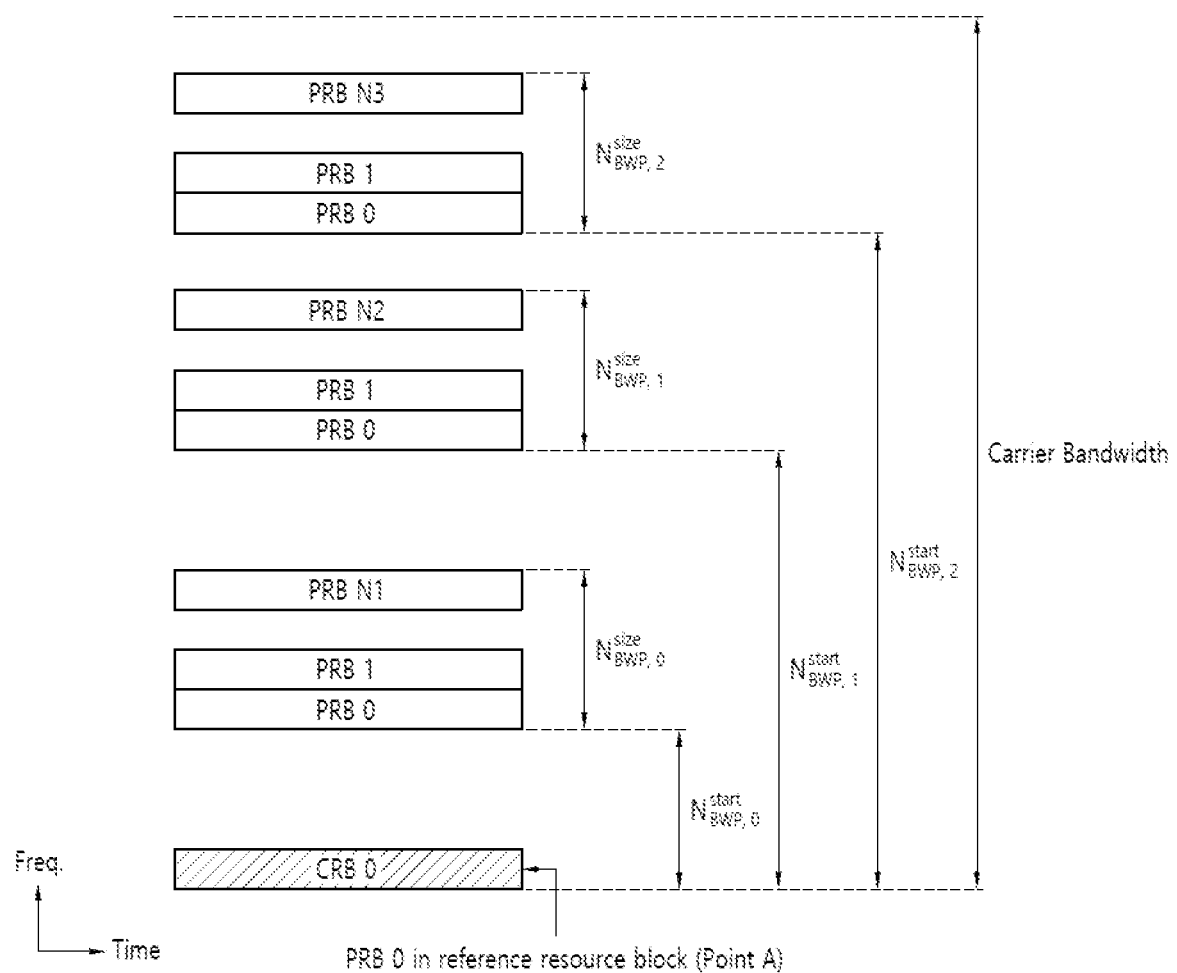
FIG. 9 shows a BWP based on an embodiment of the present disclosure.

FIG. 9 shows a BWP based on an embodiment of the present disclosure. It is assumed in the embodiment of FIG. 9 that the number of BWPs is 3.

Referring to FIG. 9, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

The BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-) configured in a carrier with respect to an out-of-coverage NR V2X UE and an RRC_IDLE UE. For the UE in the RRC_CONNECTED mode, at least one SL BWP may be activated in the carrier.

A resource pool may be a group of time-frequency resources that may be used for SL transmission and/or SL reception. From a perspective of the UE, time-domain resources in the resource pool may not be consecutive. A plurality of resource pools may be (pre-) configured to the UE in one carrier. From a perspective of a physical layer, the UE may perform unicast, groupcast, and broadcast communication by using the configured or pre-configured resource pool.

Sidelink Congestion Control

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 10:
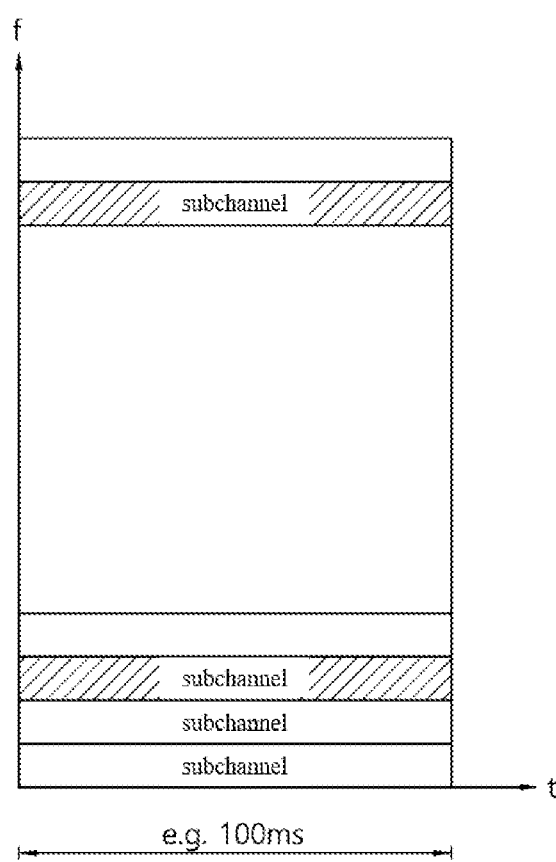
FIG. 10 shows a resource unit for CBR measurement based on an embodiment of the present disclosure.

FIG. 10 shows a resource unit for CBR measurement based on an embodiment of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Figure 11:
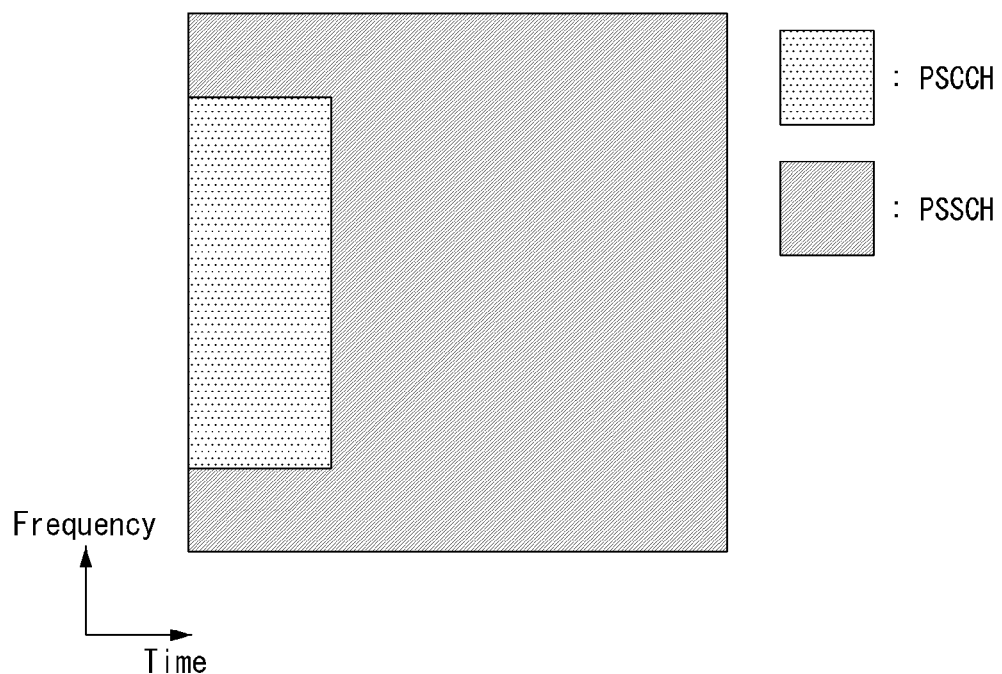
FIG. 11 illustrates a resource pool related to CBR measurement.

FIG. 11 illustrates a resource pool related to CBR measurement.

For example, as shown in the embodiment of FIG. 11, if a PSCCH and a PSSCH are multiplexed, the UE may perform one CBR measurement for one resource pool. Herein, if a PSFCH resource is configured or pre-configured, the PSFCH resource may be excluded in the CBR measurement.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

In the present disclosure, a wording "configuration or definition" may be interpreted as being (pre-) configured from the base station or the network (via pre-defined signaling (e.g., SIB, MAC signaling, or RRC signaling). For example, "A may be configured" may include "the base station or network (pre-) configures/defines or announces A for the UE". Alternatively, the wording "configuration or definition" may be interpreted as being pre-configured or defined by a system. For example, "A may be configured" may include "A is pre-configured/defined by the system".

In the present disclosure, the following abbreviations/ acronym can be used below for convenience of description.

ACK/NACK—Acknowledgement/No Acknowledgement
AGC—Automatic Gain Control
AS—Access Stratum
CB—Codeblock
CBG/CG—Codeblock Group
CBR—Channel Busy Ratio
CE—Control Element
CFO—Carrier Frequency Offset
CG—Configured Grant
CP—Cyclic Prefix
CRC—Cyclic Redundancy Check
CSI—Channel State Information
CSI-RS—Channel State Information Reference Signal
DCI—Downlink Control Channel
DL—Downlink
DM-RS—Demodulation RS
ECP—Extended CP
FDD—Frequency Division Duplex
HARQ—Hybrid Automatic Repeat Request
L1—Layer 1
L2—Layer 2
LBS—Location Based Service
LCS—Location Service
LSB—Least Significant Bit
MAC—Medium Access Control
MCS—Modulation Coding Scheme
MIB—Master Information Block
MPR—Maximum Power Reduction
MSB—Most Significant Bit
NAS—Non-Access Stratum
NCP—Normal CP
NDI—New Data Indicator
PBCH—Physical Broadcast Channel
PDCCH—Physical Downlink Control Channel
PDCP—Packet Data Convergence Protocol
PDSCH—Physical Downlink Shared Channel
PDU—Protocol Data Unit
PRS—Positioning Reference Signal
PSBCH—Physical Sidelink Broadcast Channel
PSCCH—Physical Sidelink Control Channel
PSFCH—Physical Sidelink Feedback Channel
PSS—Primary Synchronization Signal
PSSCH—Physical Sidelink Shared Channel
PUCCH—Physical Uplink Control Channel
PUSCH—Physical Uplink Shared Channel
QOS—Quality of Service
RB—Resource Block
RLC—Radio Link Control
RLM—Radio Link Monitoring
RLF—Radio Link Failure
RRC—Radio Resource Control
RS—Reference Signal
RSRP—Reference Signal Received Power
RSRQ—Reference Signal Received Quality
RSSI—Received Signal Strength Indicator
RSTD—Reference Signal Time Difference
RSU—Road Side Unit
RTT—Round Trip Time
RV—Redundancy Version
SCI—Sidelink Control Information
SCS—Sub-Carrier Spacing
SDAP—Service Data Adaptation Protocol
SIB—System Information Block
SL—Sidelink
SL OLPC—Open Loop Power Control
SL PL—Sidelink Pathloss
SLSSID—SL Synchronixatino Signal Identification
SNR—Signal-to-Noise Ratio
SPP—Sidelink Positioning Protocol
SPS—Semi-Persistent Scheduling
S-PSS—Sidelink PSS
SRS—Sounding Reference Signal
SSB—Synchronization Signal Block
SSS—Secondary Synchronization Signal
S-SSB—Sidelink SSB
S-SSS—Sidelink SSS
TB—Transport Block
TDD—Time Division Duplex
TDOA—Time Difference of Arrival
TOA—Time of Arrival
UE—User Equipment/End
UL—Uplink
Uu-PSS—Uu link PSS
Uu-SSS—Uu link SSS
XOR—Exclusive OR In the present disclosure, for example, a transmitting UE (TX UE) may be a UE that transmits data to a (target) receiving UE (RX UE). For example, the TX UE may be a UE that performs PSCCH and/or PSSCH transmission. And/or, the TX UE may be a UE that transmits an SL CSI-RS and/or SL CSI reporting request indicator to the (target) RX UE. And/or, the TX UE may be a UE that transmits a (control) channel (e.g., PSCCH, PSSCH, etc.) and/or a reference signal (e.g., DM-RS, CSI-RS, etc.) on the (control) channel, to be used for an SL RLM and/or SL RLF operation of the (target) RX UE.

In the present disclosure, for example, the receiving UE (RX UE) may be a UE that transmits an SL HARQ feedback to the TX UE based on whether decoding of data received form the transmitting UE (TX UE) is successful and/or whether detection/decoding of the PSCCH (related to PSSCH scheduling) transmitted by the TX UE is successful. And/or, the RX UE may be a UE that performs SL CSI transmission to the TX UE based on the SL CSI-RS and/or SL CSI reporting request indicator received from the TX UE. And/or, the RX UE may be a UE that transmits, to the TX UE, an SL (L1) RSRP measurement value measured based on a (pre-defined) reference signal and/or SL (L1) RSRP reporting request indicator received from the TX UE. And/or, the RX UE may be a UE that transmits data of the RX UE itself to the TX UE. And/or, the RX UE may be a UE that performs the SL RLM and/or SL RLF operation based on a (pre-configured) (control) channel received from the TX UE and/or the reference signal on the (control) channel.

In the present disclosure, for example, when the RX UE transmits SL HARQ feedback information for the PSSCH and/or PSCCH received from the TX UE, the following schemes or some of the following schemes may be considered. Here, for example, the following schemes or some of the following schemes may also be limitedly applied only when the RX UE successfully decodes/detects the PSCCH for scheduling the PSSCH.

Option 1) The RX UE may transmit NACK information to the TX UE only when failing to decode/receive the PSSCH received from the TX UE.
  Option 2) The RX UE may transmit the ACK information to the TX UE when succeeding in decoding/receiving the PSSCH received from the TX UE, and may transmit the NACK information to the TX UE when failing to decode/receive the PSSCH.

In the present disclosure, for example, the TX UE may transmit, to the RX UE, the following information or some of the following information via the SCI. For example, the TX UE may transmit some or all of the following information to the RX UE via the first SCI and/or the second SCI.

PSSCH (and/or PSCCH) related resource allocation information (e.g., time/frequency resource location/number, resource reservation information (e.g., periodicity))
  SL CSI reporting request indicator or SL (L1) RSRP (and/or SL (L1) RSRQ and/or SL (L1) RSSI) reporting request indicator
  SL CSI transmission indicator (on PSSCH) (or SL (L1) RSRP (and/or SL (L1) RSRQ and/or SL (L1) RSSI) information transmission indicator)
  MCS information
  TX POWER information
  L1 DESTINATION ID information and/or L1 SOURCE ID information
  SL HARQ PROCESS ID information
  NDI information
  RV information
  (Transmission TRAFFIC/PACKET related) QoS information (e.g., PRIORITY information)
  SL CSI-RS transmission indicator or information on the number of (transmitted) SL CSI-RS antenna ports
  TX UE location information or location (or distance area) information of a target RX UE (requesting SL HARQ feedback)
  Reference signal (e.g., DM-RS, etc.) information related to decoding (and/or channel estimation) of data transmitted on the PSSCH. For example, the reference signal information may be information related to a pattern of a (time-frequency) mapping resource of the DM-RS, RANK information, antenna port index information, etc.

In the present disclosure, since the TX UE may transmit, to the RX UE, the SCI, the first SCI, and/or the second SCI via the PSCCH, the PSCCH may be replaced/substituted with SCI and/or first SCI and/or second SCI. And/or, the SCI may be replaced/substituted with the PSCCH and/or first SCI and/or second SCI. And/or, since the TX UE may transmit the second SCI to the RX UE via the PSSCH, the PSSCH may be replaced/substituted with the second SCI.

In the present disclosure, for example, when SCI configuration fields are divided into two groups by considering a (relatively) high SCI payload size, first SCI including a first SCI configuration field group may be referred to as FIRST SCI, and second SCI including a second SCI configuration field group may be referred to as SECOND SCI. For example, the FIRST SCI may be transmitted to the RX UE via the PSCCH. For example, the SECOND SCI may be transmitted to the RX UE via (standalone) PSCCH or piggybacked and transmitted jointly with data via the PSSCH.

In the present disclosure, for example, "configuration" or "definition" may mean (PRE) CONFIGURATION (resource-pool specifically) (via pre-defined signaling (e.g., SIB, MAC, RRC, etc.) from the base station or the network.

In the present disclosure, for example, since RLF may be determined based on an OUT-OF-SYNCH (OOS) indicator or an IN-SYNCH (IS) indicator, the RLF may be replaced/substituted with OUT-OF-SYNCH (OOS) or IN-SYNCH (IS).

In the present disclosure, for example, RB may be replaced/substituted with SUBCARRIER. For example, in the present disclosure, PACKET or TRAFFIC may be replaced/substituted with TB or MAC PDU based on a transmitted layer.

In the present disclosure, CBG or CG may be replaced/substituted with TB.

In the present disclosure, for example, SOURCE ID may be replaced/substituted with DESTINATION ID.

In the present disclosure, for example, L1 ID may be replaced/substituted with L2 ID. For example, L1 ID may be L1 SOURCE ID or L1 DESTINATION ID. For example, L2 ID may be L2 SOURCE ID or L2 DESTINATION ID.

In the present disclosure, for example, an operation of reserving/selecting/determining a retransmission resource by the transmitting UE may mean an operation of reserving/selecting/determining, by the transmitting UE, a potential retransmission resource for whether is to be determined to be actually used based on the SL HARQ feedback information received from the receiving UE.

In the present disclosure, SL MODE 1 may mean a resource allocation scheme or a communication scheme in which the base station directly schedules a sidelink transmission (SL TX) resource of the UE via pre-defined signaling (e.g., DCI). Further, for example, SL MODE 2 may mean a resource allocation scheme or a communication scheme in which the UE independently selects the SL TX resource within a resource pool configured or pre-configured from the base station or network.

In the present disclosure, for example, for convenience of description, a (physical) channel that the RX UE uses when transmitting at least one of the following information to the TX UE may be referred to as a physical sidelink feedback channel (PSFCH).

SL HARQ feedback, SL CSI, SL (L1) RSRP

The base station may allocate the UE a resource (hereinafter, "SL resource") used for transmission and reception of SL channel/signal. For example, the base station may transmit information related to the resources to the UE. In the present disclosure, a scheme in which the base station allocates the SL resource to the UE may be referred to as mode 1 scheme, mode 1 operation, or resource allocation mode 1.

On the other hand, the UE may select the SL resource within a resource pool based on the sensing. In the present disclosure, a scheme in which the UE selects the SL resource may be referred to as mode 2 scheme, mode 2 operation, or resource allocation mode 3. For example, in the resource allocation mode 2, the UE may detect SCI transmitted by another UE, the UE may identify a resource reserved by another UE based on the SCI, and the UE may acquire an RSRP measurement value. And, the UE may select a resource to be used for the SL transmission except for a specific resource within a resource selection window based on the sensing result. For example, the specific resource may be based on resource(s) (e.g., removed or dropped resource(s)) based on the above Table 5.

For the sensing operation, the UE may refer to resource allocation information received via the first SCI. However, due to overhead of the first SCI, an amount of information that the UE can acquire on the first SCI may be limited.

According to various embodiments of the present disclosure, a second UE may transmit additional assistance information in order to assist a sensing operation and/or a resource (re) selection operation of a first UE. For PSSCH detection performance improvement and/or half-duplex limit reduction and/or reserved resource selection for transmission and reception of a specific signal, etc., the first UE may use the assistance information received from the second UE. In an embodiment of the present disclosure, for convenience of explanation, it is assumed that a UE-A transmits assistance information to a UE-B. It is also assumed that the UE-B selects a resource for PSCCH/PSSCH to be transmitted to the UE-A and/or a resource for PSCCH/PSSCH to be transmitted to a UE-C (i.e., a third UE) based on the assistance information received from the UE-A.

Figure 12:
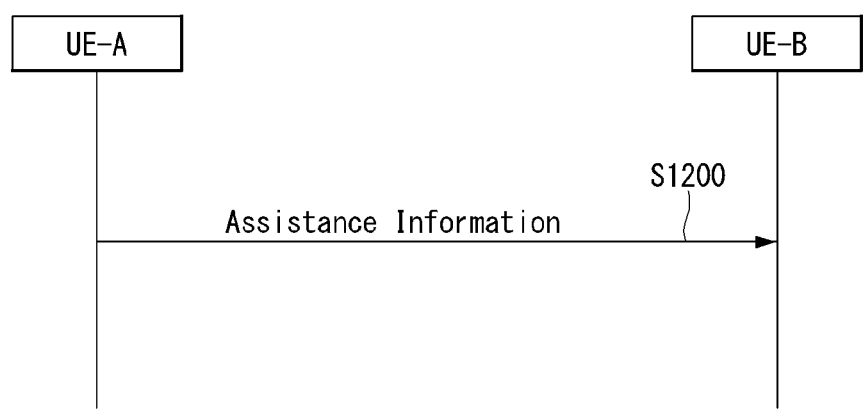
FIG. 12 illustrates a procedure in which a UE-A transmits assistance information to a UE-B based on an embodiment of the present disclosure.

FIG. 12 illustrates a procedure in which a UE-A transmits assistance information to a UE-B based on an embodiment of the present disclosure. The embodiment of FIG. 12 may be combined with various embodiments of the present disclosure.

Referring to FIG. 12, in step S1200, the UE-A may transmit assistance information to the UE-B. For example, the UE-B may select a resource for PSCCH/PSSCH to be transmitted to the UE-A based on the assistance information received from the UE-A, and the UE-B may perform SL transmission using the resource. For example, the UE-B may select a resource for PSCCH/PSSCH to be transmitted to the UE-C based on the assistance information received from the UE-A, and the UE-B may perform SL transmission using the resource. In the present disclosure, the assistance information may be referred to as additional information.

According to various embodiments of the present disclosure, the UE-B may transmit, to the UE-A, a signal requesting a transmission of the assistance information. Here, the assistance information/additional information may mean inter-UE coordination information, and the signal requesting the assistance information transmission/assistance information request signal/request for assistance information/request for additional information may mean a request for inter-UE coordination information. That is, in the present disclosure, the assistance information or the additional information may mean the inter-UE coordination information.

The inter-UE coordination information may be triggered by a request of the UE-B or a pre-configured condition. That is, the inter-UE coordination information may be triggered and transmitted by the pre-configured condition even if there is no request of the UE-B.

The inter-UE coordination information and/or the request for inter-UE coordination information may be transmitted based on the PSSCH. For example, the inter-UE coordination information and/or the request for inter-UE coordination information may be transmitted based on MAC-CE (e.g., inter-UE coordination request MAC CE, inter-UE coordination information MAC CE). For example, the inter-UE coordination information and/or the request for inter-UE coordination information may be transmitted based on the second SCI (second stage SCI format 2-C). For example, the inter-UE coordination information and/or the request for inter-UE coordination information may be transmitted based on the MAC-CE and the second SCI (second stage SCI format 2-C).

For example, the UE-A may transmit the assistance information within a specific window after a time requested by the UE-B. Alternatively, for example, the UE-A may transmit the assistance information within a specific time from a time requested by the UE-B. For example, a packet delay budget (PDB) for the assistance information transmitted by the UE-A may be configured based on a time at which the UE-A receives a request from the UE-B. The UE-B may expect that the UE-A transmits the assistance information within the PDB or a remaining PDB for the assistance information.

For example, PDB information for the assistance information, in which the assistance information of the UE-A should be transmitted from the request of the UE-B, or information related to the PDB information may be included in a request signal of the UE-B or (pre-) configured. For example, the PDB information for the assistance information or the information related to the PDB information may be included in the request signal of the UE-B. For example, the PDB information for the assistance information or the information related to the PDB information may be (pre-) configured every at least one of the following i) to iv).

i) resource pool, ii) QoS parameter, iii) service type, and iv) priority value for a transmission packet of the UE-B The PDB information for the assistance information or the information related to the PDB information may be pre-configured based on one of the above i) to iv). For example, the PDB information for the assistance information or the information related to the PDB information may be pre-configured for each resource pool. For example, the PDB information for the assistance information or the information related to the PDB information may be pre-configured for each QoS parameter.

The PDB information for the assistance information or the information related to the PDB information may be pre-configured based on two or more of the above i) to iv). For example, the PDB information for the assistance information or the information related to the PDB information may be pre-configured for each resource pool, each QoS parameter, and each service type.

The UE-A may not receive the request signal from the UE-B. As a part of a method for preventing this, the following embodiments may be considered.

For example, the UE-A may transmit a response signal to an assistance information request signal of the UE-A transmitted by the UE-B. For example, when the UE-A receives the assistance information request signal from the UE-B, the UE-A may transmit SL HARQ-ACK feedback for the request signal to the UE-B. For example, the SL HARQ-ACK feedback for PSCCH and/or PSSCH for requesting the assistance information may be always activated. Alternatively, for example, the SL HARQ-ACK feedback for PSCCH and/or PSSCH for requesting the assistance information may be (pre-) configured for each resource pool.

For example, when the UE-A receives the assistance information request signal from the UE-B, the UE-A may send again the UE-B the PSCCH and/or the PSSCH (e.g., second stage SCI and/or MAC-CE) even if the UE-A does not generate the assistance information for the request signal. In this instance, the UE-A may inform the UE-B that the UE-A does not generate the assistance information or does not transmit the assistance information. For example, so that the PSCCH/PSSCH not including assistance information for the assistance information request satisfies a PDB of the assistance information, the UE-A may transmit the PSCCH/PSSCH within a predetermined time from the request signal of the UE-B. For example, so that the PSCCH/PSSCH not including assistance information for the assistance information request satisfies a (pre-) configured PDB separately from a PDB of the assistance information, the UE-A may transmit the PSCCH/PSSCH within a predetermined time from the request signal of the UE-B.

The UE-A may not transmit the assistance information to the UE-B within a predetermined time from the request signal of the UE-B or within a time satisfying the PDB for the assistance information, or the UE-B may fail to detect the assistance information transmitted by the UE-A. The following embodiments related to this may be considered.

For example, the UE-B may not transmit again the assistance information request signal to the UE-A until the UE-B receives assistance information for the UE-B from the UE-A after transmitting the assistance information request signal to the UE-A. For example, the UE-B may not transmit again the assistance information request signal to the UE-A within a time duration corresponding to the PDB of the assistance information corresponding to the request signal after transmitting the assistance information request signal to the UE-A. For example, an operation of delaying (transmission of) the request signal up to the PDB related to the assistance information may be limitedly applied to when the UE-B does not receive the assistance information from the UE-A. For example, the UE-B may (re) start PROHIBIT_TIMER upon transmission of the assistance information request signal and may not transmit again the assistance information request signal before the PROHIBIT_TIMER expires. For example, the PROHIBIT_TIMER may run for each UE-B and may be applied for all the assistance information request signals transmitted by the UE-B. For example, the timer may run for each pair of the UE-B and the UE-A, and each timer may independently run and apply when the UE-A is different. For example, it may be assumed that pair 1 is UE-B #0 and UE-A #1, and pair 2 is UE-B #0 and UE-A #2. A timer related to the pair 1 may run independently of a timer related to the pair 2.

When the UE-B transmits the assistance information request signal to the UE-A, the UE-B may transmit, to the UE-A, geolocation information for the UE-B and COMMUNICATION RANGE REQUIREMENT information. For example, when the UE-A receives the assistance information request signal from the UE-B, the UE-A may operate as follows. Only when a distance from the UE-B (i.e., a distance between the UE-A and the UE-B) is within a COMMUNICATION RANGE REQUIREMENT, the UE-A may transmit, to the UE-B, assistance information corresponding to a request.

A resource pool related to an assistance information request may be the same as a resource pool related to assistance information. For example, a UE-B transmitting a request for assistance information and a UE-A transmitting assistance information corresponding to the above request to the UE-B may belong to or have the same transmission and/or reception resource pool. As an example, a transmission resource pool for transmission of a request for assistance information may be configured the same as a transmission resource pool for transmission of assistance information. As an example, a reception resource pool for reception of a request for assistance information may be configured the same as a reception resource pool for reception of assistance information.

For example, when the UE-B sends an assistance information request signal, the assistance information request signal may include information for at least one of the following i) to iv).
  i) Whether there is a sensing operation of the UE-B and/or a measure of whether a sensing result of the UE-B is sufficient (e.g., number or percentage of monitored and/or non-monitored slots within a sensing window)
  ii) Whether to perform a resource exclusion operation during a resource (re) selection operation of the UE-B
  iii) Whether the UE-B performs a resource (re) selection operation
  iv) Factors that the UE-A should refer to when generating assistance information (e.g., reserved resource of another UE and/or SL non-receivable slot of the UE-A and/or whether there is a PSFCH TX/RX collision, etc.)

When a request of assistance information and signaling of assistance information are performed without limitation, congestion may increase. In this regard, the following embodiments may be considered.

A request for assistance information (i.e., a request for inter-UE coordination information) and/or assistance information (i.e., inter-UE coordination information) may be transmitted based on pre-defined/pre-configured conditions. This is described in detail below.

As an example, (transmission of) a request for assistance information may be triggered based on pre-configured conditions (e.g., higher layer parameter sl-TriggerConditionRequest). For example, a request for assistance information transmitted by the UE-B to the UE-A may be transmitted when there is available data to be transmitted by the UE-B to the UE-A (e.g., when a value of the sl-TriggerConditionRequest is set to 1). In this instance, the request for assistance information may be transmitted by being multiplexed with data of the UE-B to be transmitted to the UE-A. When the value of the sl-TriggerConditionRequest is set to 0, conditions for the transmission of the request for assistance information may vary depending on UE-B implementation.

As an example, (transmission of) assistance information may be triggered based on pre-configured conditions (e.g., higher layer parameter sl-TriggerConditionCoordInfo) in addition to the request for assistance information. For example, assistance information transmitted by the UE-A may be transmitted when there is available data to be transmitted by the UE-A to the UE-B (e.g., when a value of the sl-TriggerConditionCoordInfo is set to 1). In this instance, the assistance information may be transmitted by being multiplexed with data of the UE-A to be transmitted to the UE-B. That is, the assistance information may be transmitted only when there is data that the UE-A transmits to the UE-B together with the corresponding assistance information. When the value of the sl-TriggerConditionCoordInfo is set to 0, conditions for the transmission of the assistance information may vary depending on UE-A implementation.

The multiplexing may be based on at least one of time division multiplexing (TDM), frequency division multiplexing (FDM), code division multiplexing (CDM), or joint-encoding.

The UE-B may transmit a request for assistance information to a plurality of UEs-A in the form of groupcast. For example, the UE-B may transmit, to each UE-A, an assistance information request signal for each M_ID (member ID for distinguishing the RX UE from groupcast HARQ-ACK feedback OPTION 2). The UE-B may transmit the request for assistance information by including a single M_ID value or a plurality of M_ID values in the request for assistance information. In this case, for example, when the UE-A receives a request signal corresponding to M_ID value of the UE-A, the UE-A may transmit, to the UE-B, assistance information corresponding to the request. For example, the UE-B may transmit an assistance information request signal per each distance range from the UE-B. In this instance, the UE-B may transmit the request for assistance information by including single or multiple distance range information in the request for assistance information. In this case, for example, the UE-A measures a distance from the UE-B. When the UE-A receives a request signal corresponding to a distance range including the measured distance, the UE-A may transmit, to the UE-B, assistance information corresponding to the request.

For example, UE-A may ignore an assistance information request signal received from UE-B in a specific situation. That is, in the specific situation, UE-A may not perform an operation for transmitting assistance information to UE-B. It will be described in detail below.

For example, the specific situation may be a case in which L1 or L2 destination ID and/or L1 or L2 source ID for the assistance information request signal is not the L1 or L2 source ID of UE-A. For example, the specific situation may be a case in which L1 or L2 destination ID and/or the L1 or L2 source ID for the assistance information request signal is not L1 or L2 destination ID that UE-A will attempt to decode. For example, the specific situation may be a case in which the L1 destination ID (or L2 destination ID) used during UE-B transmission (assistance information request signal transmission) is not L1 source ID (or L2 source ID) used during UE-A transmission (assistance information transmission) in unicast type sidelink communication. For example, the specific situation may be a case in which L1 destination ID (or L2 destination ID) used during UE-B transmission (assistance information request signal transmission) is not L1 destination ID (or L2 destination ID) that UE-A will attempt to decode in groupcast/broadcast type sidelink communication. For example, the specific situation may be a case in which UE-A does not expect to receive transmission of a UE that has transmitted an assistance information request.

For example, the specific situation may be a case in which UE-A does not perform sensing for all or some slots in a sensing window for generating assistance information on UE-B transmission resources. For example, when the ratio of the number of slots in which UE-A does not perform sensing to the total number of slots in the sensing window for generating assistance information is equal to or greater than a (previously) set threshold value, UE-A may ignore a request of UE-B. For example, when the ratio of the number of slots in which UE-A has performed sensing to the total number of slots in the sensing window for generating assistance information is equal to or less than a (previously) set threshold value, UE-A may ignore a request of UE-B.

For example, the specific situation may be a case in which is UE-A does not decode second SCI and/or a PSSCH for all or some slots in the sensing window for generating assistance information on UE-B transmission resources. For example, when the ratio of the number of slots in which UE-A has not attempted to detect the second SCI and/or the PSSCH to the total number of slots in the sensing window for generating assistance information is equal to or greater than a (previously) set threshold value, UE-A may ignore a request of UE-B. For example, when the ratio of the number of slots in which UE-A has attempted to detect the second SCI and/or the PSSCH to the total number of slots in the sensing window for generating assistance information is equal to or less than a (previously) set threshold value, UE-A may ignore a request of UE-B.

For example, the specific situation may be a case in which a channel occupancy ratio (CR) measurement value of UE-A is equal to or greater than a CR limit. For example, the CR measurement value may include a case where UE-A sends assistance information to UE-B. For example, the CR measurement value may exclude a case where UE-A sends assistance information to UE-B.

For example, the specific situation may be a case in which UE-A cannot generate candidate resources based on a transmission priority, PDB for transmission packet or TB, a transmission resource reservation period, a transmission reselection counter, the number of subchannels for transmission, and/or an additional information type provided by UE-A upon request from UE-B. For example, the specific situation may be a case in which information loss occurs when UE-A stores a sensing result. For example, the above-described embodiment may be limited to a case in which UE-A supports only preferred resources as the additional information type.

For example, the specific situation may be a case in which UE-A does not have sufficient reception resources for UE-B transmission. For example, more specifically, the specific situation may be a case in which the amount of preferred resources for UE-B transmission, determined by UE-A, is equal to or less than a (previously) set threshold value. For example, the specific situation may be a case in which the ratio of the amount of preferred resources for UE-B transmission determined by UE-A to the amount of resources within a resource selection window of UE-B or a reference resource selection window is equal to or less than a (previously) set threshold value. For example, the specific situation may be a case in which the ratio of the amount of preferred resources for UE-B transmission determined by UE-A to the amount of resources from the beginning of the resource selection window for UE-B transmission to T_2, MIN is equal to or less than a (previously) set threshold value. In this case, T_2,MIN may mean a minimum value of T2 related to the determination of the resource selection window (time interval from n+T1 to n+T2, where n is a slot in which resource selection is triggered). In the above-described embodiment, the amount of resources may be interpreted/applied as the number of resources.

For example, more specifically, the specific situation may be a case in which the amount of non-preferred resources for UE-B transmission determined by UE-A may be equal to or greater than a (previously) set threshold value. For example, more specifically, it may be a case in which the amount of non-preferred resources for UE-B transmission determined by UE-A is not fully included in additional information. For example, the specific situation may be a case in which the ratio of the amount of non-preferred resources for UE-B transmission determined by UE-A to the amount of resources within the resource selection window of UE-B or the reference resource selection window is equal to or greater than a (previously) set threshold value. For example, the specific situation may be a case in which the ratio of the amount of non-preferred resources for UE-B transmission determined by UE-A to the amount (number) of resources from the beginning of the resource selection window for UE-B transmission to T_2,MIN is equal to or greater than a (previously) set threshold value. In the above-described embodiment, the amount of resources may be interpreted/applied as the number of resources.

For example, the specific situation may be i) a case in which UE-A recognizes that UE-B does not support a sensing operation for resource (re) selection, ii) a case in which UE-B recognizes that UE-B does not use a sensing operation for resource (re) selection, and/or iii) a case in which UE-A does not support a preferred resource as an additional information type. For example, UE-A may determine the status of UE-B based on i) request information and/or ii) a setup process between UE-A and UE-B. For example, UE-A may recognize/obtain the status of UE-B from request information of UE-B. For example, UE-A may recognize/acquire the status of UE-B based on information exchanged between UE-A and UE-B through a previously performed setup process.

Meanwhile, additional information (inter-UE coordination information) and/or a request signal for the additional information (request for the inter-UE coordination information) may be transmitted through a second SCI (e.g., second stage SCI format). In this case, when the total number of sizes of the second SCI (e.g., SCI format 2-C) increases, UE implementation complexity may increase. In this regard, the following embodiments may be conceived. Here, the size of the second SCI may mean the payload size of the second SCI.

For example, when the additional information type (e.g., resource set type field of SCI format 2-C) is a preferred resource (e.g., the value of the resource set type field is 0) and the additional information type is a non-preferred resource (e.g., when the value of the resource set type field is 1), the sizes of the second SCI for the respective cases may be set to be identical.

For example, the size of second SCI corresponding to additional information and the size of second SCI corresponding to an additional information request may be set to be the identical. For example, the size of the second SCI corresponding to the additional information may be set to be the same as the size of at least one of SCI FORMAT 1-A, SCI FORMAT 2-A, and SCI FORMAT 2-B. In this case, the size of the second SCI may be different according to the additional information type.

For example, the size of the second SCI corresponding to the additional information request may be set to be the same as the size of at least one of SCI FORMAT 1-A, SCI FORMAT 2-A, and SCI FORMAT 2-B. In this case, the second SCI size for the additional information and the second SCI size for the additional information request may be different.

In an embodiment of the present disclosure, an operation of equalizing the sizes of second SCI may be performed as follows. Different second SCI sizes may be determined based on the size of each required size. Specifically, a final size may be determined based on the largest value among second SCI sizes (e.g., payload sizes of second SCI). For example, the final size may be the size of the second SCI for the additional information request. In this case, the size of the second SCI for the additional information may be adjusted based on the size of the second SCI for the additional information request. For example, the final size may be the size of the second SCI for additional information. In this case, the size of the second SCI for the additional information request may be adjusted based on the size of the second SCI for the additional information.

In this case, different second SCI sizes may be adjusted to be the same size (e.g., the final size) by appending padding bits. The padding bits may be a bit value set to zero (0), one (1), or a combination of specific values. The padding bits may be appended to each field of the second SCI or to the LSB of the second SCI.

For example, the padding bits may be appended to the second SCI for the additional information based on the size of the second SCI for the additional information request. That is, the second SCI for the additional information may include the padding bits in addition to fields related to the additional information.

For example, the padding bits may be appended to the second SCI for the additional information request based on the size of the second SCI for the additional information. That is, the second SCI for the additional information request may include the padding bits in addition to fields related to the additional information request.

In the embodiment of the present disclosure, when the size of the second SCI is different according to additional information type, the second SCI may have an indicator for distinguishing between a preferred resource or a non-preferred resource. Further, the first SCI may distinguish between a preferred resource and a non-preferred resource. For example, the second SCI may include a field indicating a preferred resource or a non-preferred resource (e.g., a resource set type field).

When the value of the resource set type field (1 bit) is 0, it may indicate a preferred resource set (or a request for inter-UE coordination information providing a preferred resource set). When the value of the resource set type field (1 bit) is 1, it may indicate a non-preferred resource set (or a request for inter-UE coordination information providing a non-preferred resource set).

In the embodiment of the present disclosure, when the size of the second SCI for the additional information and the size of the second SCI for the additional information request are identical, the second SCI may include an indicator for distinguishing between the second SCI for the additional information and the second SCI for the additional information request. Further, the first SCI may indicate the second SCI for the additional information and the second SCI for the additional information request in a distinguishing manner.

As an example, the second SCI may include a field (e.g., a providing/requesting indicator field) indicating additional information (inter-UE coordination information) or a request for additional information (a request for inter-UE coordination information). If the value of the providing/requesting indicator field (1 bit) is 0, it may indicate that the corresponding second SCI is used to provide inter-UE coordination information. If the value of the providing/requesting indicator field (1 bit) is 1, it may indicate that the corresponding second SCI is used to request inter-UE coordination information.

Meanwhile, UE-B may be in a state in which different packets are available. In this case, when UE-B transmits a request for additional information to UE-A, it is necessary to determine how to configure information to be sent along with the request. In this regard, the following embodiments may be conceived.

For example, UE-B may include highest priority (or a lowest priority value) among data related to the same destination ID corresponding to UE-B transmission in an additional information request. For example, UE-B may include, in the additional information request, the tightest latency requirement (i.e., the shortest latency requirement) or the smallest PDB value among data corresponding to the same destination ID corresponding to UE-B transmission.

For example, UE-B may include, in the additional information request, a latency requirement or PDB value of data corresponding to the highest priority (or lowest priority value) among data related to the same destination ID corresponding to UE-B transmission.

For example, UE-B may include, in the additional information request, a plurality of destination IDs corresponding to UE-B transmission. In this case, a TX priority, TX PDB, a resource selection window, the number of TX subchannels, a QoS parameter, a cast type, whether HARQ-ACK feedback is activated, a HARQ-ACK feedback option, the maximum number of retransmissions, the number of retransmissions, a resource reservation cycle, a resource reselection counter, and/or an additional information type may be configured for each destination ID, and information configured for each destination ID may be included in the additional information request. For example, some of the aforementioned information may be transmitted as a single value for each request signal and may be commonly applied to a plurality of destination IDs.

Figure 13:
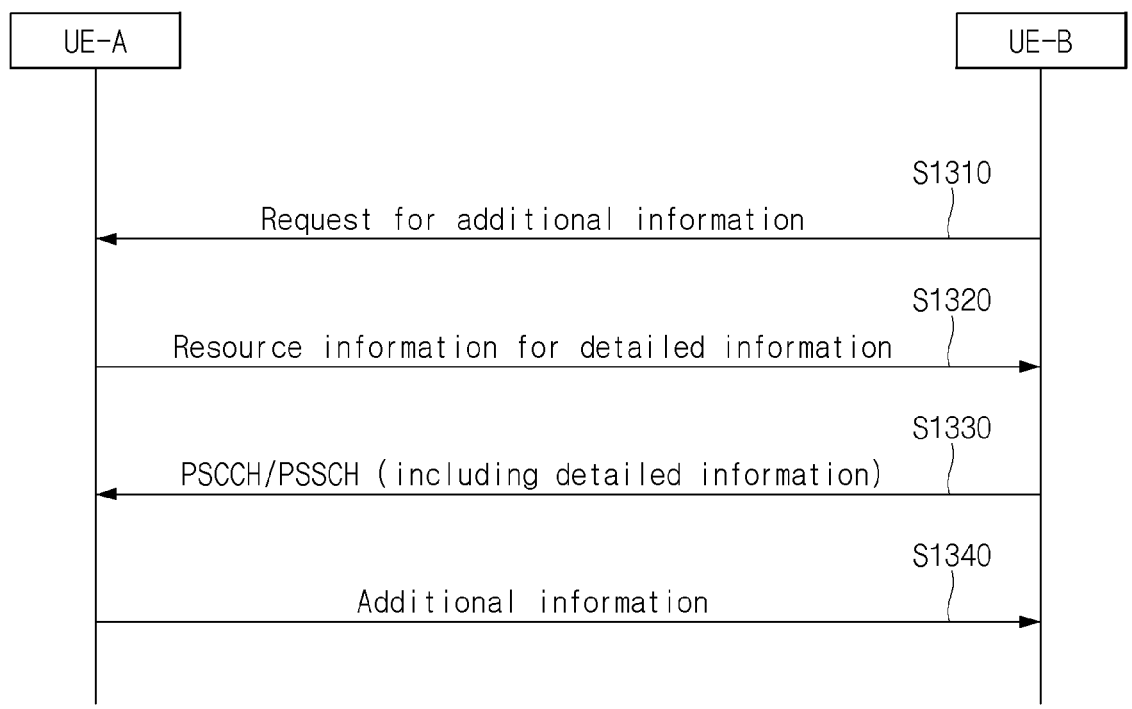
FIG. 13 illustrates a procedure in which a UE-A transmits assistance information to a UE-B based on an embodiment of the present disclosure.

FIG. 13 illustrates a procedure in which a UE-A transmits assistance information to a UE-B based on an embodiment of the present disclosure. The embodiment of FIG. 13 may be combined with various embodiments of the present disclosure.

Referring to FIG. 13, in step S1310, for example, a UE-B transmitting a request for additional information may request resource allocation information and/or available resource information from a UE-A transmitting additional information in the form of PSFCH resource. Here, the additional information may mean inter-UE coordination information, and the request for additional information may mean a request for inter-UE coordination information.

In step S1320, for example, the UE-A receiving the request for additional information may transmit resource information to the UE-B in order to acquire detailed information about the request (e.g., additional request information or detailed information) from the UE-B transmitting the request for additional information.

For example, the resource information may include information on resources available or recommended for PSCCH/PSSCH transmission. For example, the resource information may include information on resources that are unavailable or not recommended for PSCCH/PSSCH transmission.

In step S1330, for example, the UE-B receiving resource information for PSCCH/PSSCH for additional request information may transmit the PSCCH/PSSCH based on the resource information. For example, via the PSCCH/PSSCH, at least one of reference transmission priority information, a resource area of interest (e.g., a reference resource selection window), a reference resource reservation period, a reference resource reselection counter, the number of retransmissions, the maximum number of retransmissions, the number of reference PSSCH transmission subchannels, a cast type, a service type, PDB information for additional information, reference PDB information, SL HARQ feedback presence/absence, QoS parameter, and/or a type of additional information (e.g., preferred resource or non-preferred resource or additional information reception operation or additional information utilization method, etc.) may be transmitted. For example, the reference parameters may be inherited parameters for a transmission packet of a UE transmitting the detailed information related to the request for additional information. For example, the reference transmission priority information may represent a priority value for requesting the additional information. The priority value for requesting the additional information may be the same as a priority value of data (or Transport Block) to be transmitted from the UE-B to the UE-A.

In step S1340, for example, the UE-A receiving the detailed information related to the request for additional information may provide/transmit, to the UE-B transmitting the request for additional information, resource information (e.g., preferred resource information or non-preferred resource information) that the UE-B transmitting the request for additional information can utilize for resource reselection for data transmission, based on the reference parameter (e.g., reference transmission priority information, type of additional information, etc.). For example, the UE-B receiving the additional information may use the additional information to (re) select a resource to be used for data transmission later. That is, for example, the UE-B receiving the additional information may (re) select a resource to be used for data transmission later based on the additional information.

The above-described operation is merely an example and does not have to be performed such that each step is necessarily included. For example, in the embodiment described above, the step S1320 may not be performed. Specifically, the steps S1310 and S1330 may be performed as one step for the request for additional information. That is, the UE-B may transmit, to the UE-A, the request for inter-UE coordination information including the above-described detailed information. The UE-A may transmit the inter-UE coordination information to the UE-B based on the detailed information. For example, the UE-A may transmit the inter-UE coordination information based on the reference transmission priority information (e.g., priority value) receiving from the UE-B. That is, a priority value included in the request for inter-UE coordination information (a priority value for transmission of the request for inter-UE coordination information) may be the same as a priority value included in the inter-UE coordination information (a priority value for transmission of the inter-UE coordination information).

Various embodiments of the present disclosure can be combined with each other.

From an implementation perspective, operations (e.g., operations related to transmission and reception of inter-UE coordination information) of the first UE (UE-A)/second UE (UE-B) according to the above-described embodiments may be processed by a device (e.g., processors 102 and 202 of FIG. 17) of FIGS. 16 to 21 to be described later.

Figure 17:
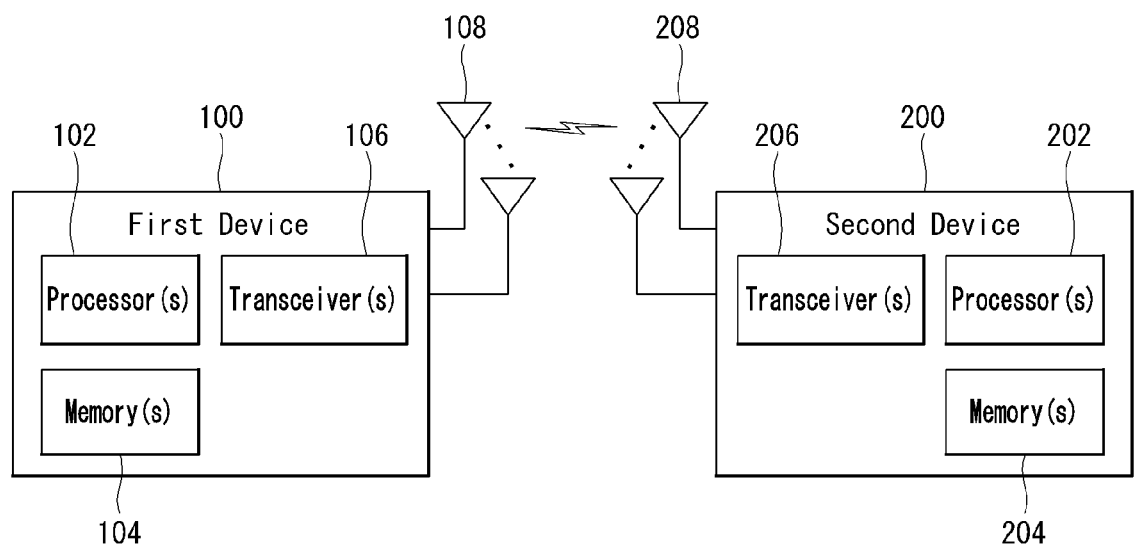
FIG. 17 shows wireless devices based on an embodiment of the present disclosure.

Further, operations (e.g., operations related to transmission and reception of inter-UE coordination information) of the first UE (UE-A)/second UE (UE-B) according to the above-described embodiments may be stored in a memory (e.g., memories 104 and 204 of FIG. 17) in the form of commands/programs (e.g., instructions, executable codes) for running at least one processor (e.g., processors 102 and 202 of FIG. 17).

Hereinafter, the above-described embodiments are described in detail from a perspective of the operation of the first UE with reference to FIG. 14. Methods to be described below are merely distinguished for convenience of explanation. Thus, as long as the methods are not mutually exclusive, it is obvious that configuration of any method can be substituted or combined with configuration of another method.

Figure 14:
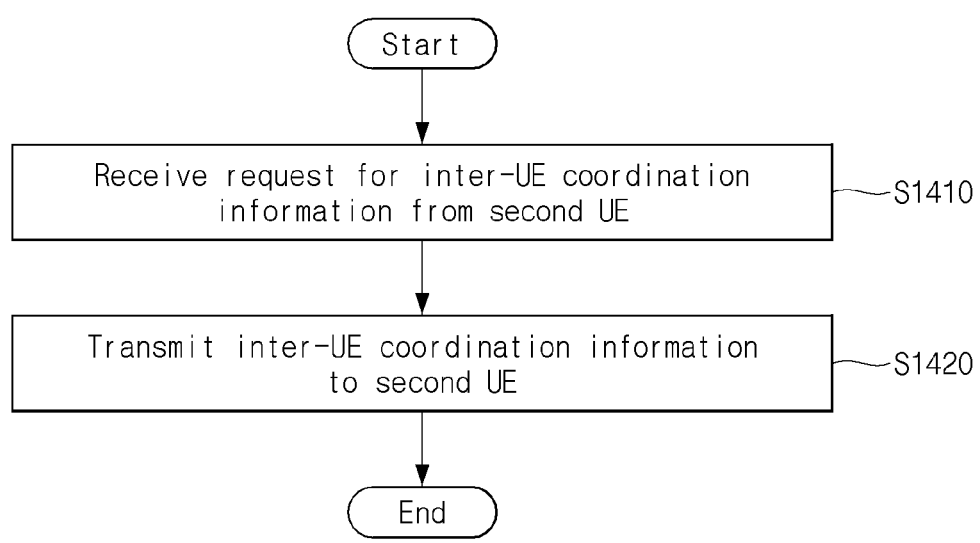
FIG. 14 is a flow chart illustrating a method of transmitting, by a first UE, inter-UE coordination information in a wireless communication system according to an embodiment of the present disclosure.

FIG. 14 is a flow chart illustrating a method of transmitting, by a first UE, inter-UE coordination information in a wireless communication system according to an embodiment of the present disclosure.

Referring to FIG. 14, a method of transmitting inter-UE coordination information by a first UE in a wireless communication system according to an embodiment of the present disclosure may include receiving a request for inter-UE coordination information from a second UE (S1410) and transmitting the inter-UE coordination information to the second UE (S1420).

In S1410, the first UE receives a request for inter-UE coordination information from the second UE. For example, the first UE may receive first sidelink control information (SCI) including a request for inter-UE coordination information from the second UE. The first UE may be based on the above-described UE-A that transmits assistance information/additional information/inter-UE coordination information. The second UE may be based on the above-described UE-B that transmits a request for assistance information/additional information/inter-UE coordination information.

A transmission of the request may be triggered based on a pre-configured condition in order to minimize a degree of congestion caused by signaling of request-based inter-UE coordination information. This is described in detail below. For example, the pre-configured condition may be based on pre-configured higher layer parameter sl-TriggerConditionRequest.

According to an embodiment, the request may be received based on a presence of data transmitted by the second UE (e.g., when a value of sl-TriggerConditionRequest is set to 1). Based on that the second UE has first data to be transmitted to the first UE, the request may be received based on a medium access control-control element (MAC-CE) and/or second sidelink control information (SCI). For example, when the value of sl-TriggerConditionRequest is set to 0, conditions under which the request is received may vary based on an implementation of the second UE (UE-B).

As above, the request may be transmitted limitedly only when the second UE has data to be transmitted to the first UE. Thus, the degree of congestion caused by signaling of the request-based inter-UE coordination information can be minimized.

For example, the request may be received based on the MAC-CE. For example, the request may be received based on the MAC-CE and the second SCI (second stage SCI). The MAC-CE and the second SCI may mean a container for delivering information related to the request for inter-UE coordination information. That is, the information related to the request for inter-UE coordination information may be included in the MAC-CE (e.g., Inter-UE Coordination Request MAC-CE) and/or the second SCI (e.g., SCI format 2-C) and may be transmitted from the second UE to the first UE.

For example, the MAC-CE and/or the second SCI (second stage SCI) may be used as the container for the request based on RRC configuration for sidelink communication. As a detailed example, the use of the second SCI as the container may be enabled or disabled based on the RRC configuration. For example, the higher layer parameter sl-ContainerRequest may be configured to be enabled or disabled.

Based on the sl-ContainerRequest being configured to be enabled, the second SCI in addition to the MAC-CE may be additionally used as the container for the request. For example, based on latency requirements for sidelink communication being tight (e.g., based on the latency requirements being less than or equal to a pre-defined value), the sl-ContainerRequest may be configured to be enabled. That is, when a low latency is required, the second SCI transmitted based on L1 ID (Layer 1 ID) may be additionally utilized for faster processing. In this instance, the request may be included in each of the MAC-CE and the second SCI (second stage SCI) and may be transmitted from the second UE to the first UE. The MAC-CE may be transmitted based on L2 ID (Layer 2 ID), and the second SCI may be transmitted based on L1 ID (Layer 1 ID). In this case, the following operation may be considered. The first UE receiving the request included in the second SCI may first transmit the inter-UE coordination information to the second UE, and when the L2 ID obtained from the MAC-CE is different from L2 ID of the first UE, transmission of the inter-UE coordination information may stop. Based on the number of bits of the L1 ID being different from the number of bits of the L2 ID, two or more L2 IDs corresponding to one L1 ID may be present (e.g., the number of bits of L1 ID<the number of bits of L2 ID). On the contrary, two or more L1 IDs corresponding to one L2 ID may be present (e.g., the number of bits of L1 ID>the number of bits of L2 ID). The first UE may transmit the inter-UE coordination information to the second UE only when the L1 ID included in the second SCI and the L2 ID included in the MAC-CE are identical to an ID of the first UE. Reliability of the signaling of the request-based inter-UE coordination information can be improved compared to when the request for inter-UE coordination information is transmitted only via the second SCI as described above.

Based on the sl-ContainerRequest being configured to be disabled, the MAC-CE may be used as the container for the request. For example, when the low latency is not required (e.g., based on the latency requirements being greater than the pre-defined value), the sl-ContainerRequest may be configured to be disabled. In this instance, the request may be included in the MAC-CE and may be transmitted from the second UE to the first UE.

The latency requirements are merely one example of the configuration of the container for the request. That is, the RRC configuration (e.g., configuration of sl-ContainerRequest) related to the utilization of the MAC-CE and/or the second SCI may be performed based on other requirements for sidelink communication (e.g., requirements other than latency or one or more requirements including latency). For example, based on requirements other than the latency, the sl-ContainerRequest may be configured to be enabled or disabled. For example, based on a combination of one or more requirements including the latency, the sl-ContainerRequest may be configured to be enabled or disabled.

The first data and the request may be received based on a physical sidelink shared channel (PSSCH). The first data and the request may be multiplexed and received. That is, the request may be received by being multiplexed with the first data in which a SOURCE ID and a DESTINATION ID are the same. The multiplexing may be based on at least one of time division multiplexing (TDM), frequency division multiplexing (FDM), code division multiplexing (CDM), or joint-encoding.

According to an embodiment, the first SCI (i.e., second stage SCI including the request) may include detailed information related to the inter-UE coordination information. The detailed information may include information related to at least one of i) a priority, ii) a resource selection window, iii) a number of subchannels and iv) a type of resource.

Information related to the priority may be a priority value for the request (or a priority value for transmission of the request). For example, the information related to the priority may be based on a priority field of the second SCI (SCI format 2-C). For example, the information related to the priority may be based on a priority field of MAC-CE (Inter-UE Coordination Request MAC CE).

Information related to the resource selection window may represent a location of a window for generating the inter-UE coordination information. The first UE may generate the inter-UE coordination information based on a resource within the resource selection window. More specifically, the first UE may determine the resource within the resource selection window as a preferred resource or a non-preferred resource. The inter-UE coordination information may include information related to the preferred resource or the non-preferred resource. For example, the information related to the resource selection window may be based on a resource selection window location field of the second SCI (SCI format 2-C). For example, the information related to the resource selection window may be based on an RSWL field of MAC-CE (Inter-UE Coordination Request MAC CE).

Information related to the number of subchannels may mean a number of subchannels to be used for transmission of a physical sidelink control channel (PSCCH) and a physical sidelink shared channel (PSSCH). The number of subchannels may be included when a type of resource related to the inter-UE coordination information is the preferred resource. For example, the information related to the number of subchannels may be based on a field of the number of subchannels of the second SCI (SCI format 2-C). For example, the information related to the number of subchannels may be based on the field of the number of subchannels of MAC-CE (Inter-UE Coordination Request MAC CE).

Information related to the type of resource may be information representing a type of resource determined in the resource selection window. Specifically, the type of resource may be based on the preferred resource or the non-preferred resource. For example, the information related to the type of resource may be based on a resource set type field of the second SCI (SCI format 2-C). For example, the information related to the type of resource may be based on an RT field of MAC-CE (Inter-UE Coordination Request MAC CE).

According to an embodiment, the request may be received based on the first SCI (first second stage SCI). Specifically, the first SCI may be received based on a first physical sidelink shared channel (PSSCH) scheduled by a first stage SCI related to a first physical sidelink control channel (PSCCH). In this case, the first stage SCI related to the first PSCCH may include a field (e.g., second stage SCI format field) indicating the format of the first SCI.

According to the step S1410, an operation of the first UE (100/200 of FIGS. 16 to 21) to receive a request for inter-UE coordination information from the second UE (100/200 of FIGS. 16 to 21) may be implemented by a device of FIGS. 16 to 21. For example, referring to FIG. 17, one or more processors 102 may control one or more transceivers 106 and/or one or more memories 104 so as to receive the request for inter-UE coordination information from the second UE 200.

In S1420, the first UE transmit the inter-UE coordination information to the second UE. For example, the first UE may transmit second SCI including the inter-UE coordination information to the second UE. Here, the inter-UE coordination information may be transmitted by being triggered by i) the aforementioned request or ii) a condition other than the request.

When the inter-UE coordination information is triggered by conditions other than the request, the inter-UE coordination information may be transmitted based on a pre-configured condition in order to minimize a degree of congestion. For example, the pre-configured condition may be based on a higher layer parameter sl-TriggerCondition-CoordInfo.

According to an embodiment, based on the inter-UE coordination information being triggered by conditions other than the request, the inter-UE coordination information may be transmitted based on a presence of data transmitted by the first UE. Specifically, based on that the first UE has second data to be transmitted to the second UE, the inter-UE coordination information may be transmitted based on MAC-CE and/or a second SCI (e.g., when a value of sl-TriggerConditionCoordInfo is set to 1). For example, when the value of sl-TriggerConditionCoordInfo is set to 0, conditions for transmission of the inter-UE coordination information may vary based on an implementation of the first UE (UE-A).

When the inter-UE coordination information is triggered by conditions other than the request as described above, the inter-UE coordination information is transmitted limitedly only when the first UE has data to be transmitted to the second UE. Thus, the degree of congestion caused by signaling of the inter-UE coordination information triggered by conditions other than the request can be minimized.

The second data and the inter-UE coordination information may be transmitted based on a physical sidelink shared channel (PSSCH). The second data and the inter-UE coordination information may be transmitted together. Specifically, the second data and the inter-UE coordination information may be multiplexed and transmitted. That is, the inter-UE coordination information may be transmitted by being multiplexed with the second data in which a SOURCE ID and a DESTINATION ID are the same. The multiplexing may be based on at least one of time division multiplexing (TDM), frequency division multiplexing (FDM), code division multiplexing (CDM), or joint-encoding.

According to an embodiment, the inter-UE coordination information may be transmitted based on MAC-CE and/or a second SCI. For example, the inter-UE coordination information may be transmitted based on the MAC-CE. For example, the inter-UE coordination information may be transmitted based on the MAC-CE and the second SCI (second stage SCI). The MAC-CE and the second SCI may mean a container for delivering the inter-UE coordination information. That is, the inter-UE coordination information may be included in the MAC-CE (e.g., Inter-UE Coordination Information MAC-CE) and/or the second SCI (e.g., SCI format 2-C) and may be transmitted from the first UE to the second UE.

Based on the number of resource combinations related to the inter-UE coordination information, the inter-UE coordination information may be transmitted based on i) the MAC-CE or ii) the MAC-CE and the second SCI.

Based on the number of resource combinations related to the inter-UE coordination information being greater than a predefined value (e.g., 3), the inter-UE coordination information may be transmitted based on the MAC-CE.

Based on the number of resource combinations related to the inter-UE coordination information being less than or equal to the predefined value, the inter-UE coordination information may be transmitted based on i) the MAC-CE or ii) the MAC-CE and the second SCI.

The resource combination means a combination including a time resource indicator value (TRIV), a frequency resource indicator value (FRIV), and a resource reservation period P. The number of resource combinations may be indicated based on a resource combination field of the second SCI.

According to an embodiment, the inter-UE coordination information may be transmitted within a predefined time. Specifically, the inter-UE coordination information may be transmitted within the predefined time from a time at which the inter-UE coordination information is triggered (by the request or conditions other than the request). The predefined time may be determined based on a packet delay budget (PDB). For example, the PDB may be configured/determined based on a time at which the request is received. For example, the PDB may be configured/determined based on a time at which the inter-UE coordination information is triggered by conditions other than the request. For example, information related to the PDB may be pre-configured. For example, the information related to the PDB may be included in the request. The information related to the PDB may be based on an embodiment related to PDB information about the assistance information described above.

According to an embodiment, a first payload size of first SCI may be the same as a second payload size of second SCI based on based on the first SCI being transmitted on a first physical sidelink shared channel (PSSCH) and the second SCI being transmitted on a second PSSCH.

The above-described embodiments related to the first/second payload sizes may be applied only when resource pools are the same. That is, based on the fact that the first PSSCH (first SCI) and the second PSSCH (second SCI) are transmitted based on the same resource pool, the first payload size of the first SCI may be the same as the second payload size of the second SCI. The same resource pool may mean that a transmission and/or reception resource pool of the first UE is the same as a transmission and/or reception resource pool of the second UE. For example, the same resource pool may mean that a transmission resource pool for transmission of the first PSSCH (first SCI) is the same as a transmission resource pool for transmission of the second PSSCH (second SCI). For example, the same resource pool may mean that a reception resource pool for reception of the first PSSCH (first SCI) is the same as a reception resource pool for reception of the second PSSCH (second SCI). For example, the same resource pool may mean that a transmission resource pool for transmission of the first PSSCH (first SCI) is the same as a reception resource pool for reception of the second PSSCH (second SCI). For example, the same resource pool may mean that a reception resource pool for reception of the first PSSCH (first SCI) is the same as a transmission resource pool for transmission of the second PSSCH (second SCI).

According to an embodiment, the first payload size of the first SCI may be the same as the second payload size of the second SCI based on the first SCI being transmitted on the first PSSCH and the second SCI being transmitted on the second PSSCH same in the same resource pool.

Here, the first SCI (e.g., first second stage SCI) and the second SCI (e.g., second second stage SCI) may include an indicator (e.g., providing/requesting indicator field) indicating the request or the inter-UE coordination information. Specifically, the indicator of the first SCI may be set to a value indicating the request. The indicator of the second SCI may be set to a value representing the inter-UE coordination information.

As an example, the indicator (e.g., providing/requesting indicator field) included in the first second stage SCI transmitted by the second UE may indicate a request for inter-UE coordination information. The indicator (e.g., providing/requesting indicator field) included in the second second stage SCI transmitted by the first UE may indicate inter-UE coordination information.

The embodiment related to the first/second payload sizes may be based on the above-described embodiment related to the size of the second SCI corresponding to additional information/request for additional information.

Based on appending of padding bits, the first payload size and the second payload size may be set to be identical. That is, the padding bits may be used to adjust second SCI format sizes to one size. It will be described in detail below.

The padding bits may be appended based on the first payload size or the second payload size. For example, the padding bits may be appended to the first SCI based on the second payload size. For example, the padding bits may be appended to the second SCI based on the first payload size.

The padding bits may be based on a bit set to a specific value. For example, the padding bits may be based on a bit set to 0 (e.g., "000" for 3 bits). For example, the padding bits may be based on a bit set to 1 (e.g., "111" for 3 bits).

According to an embodiment, a resource pool related to the request may be the same as a resource pool related to the inter-UE coordination information. For example, a resource pool to which a preferred resource or a non-preferred resource related to the request belongs may be the same as a resource pool to which a preferred resource or a non-preferred resource related to the inter-UE coordination information belongs. For example, a resource pool related to reception of the request may be the same as a resource pool for transmitting inter-UE coordination information. Specifically, a transmission resource pool for transmission of the inter-UE coordination information may be configured the same as a transmission resource pool for transmission of the request. That is, the inter-UE coordination information may be transmitted based on a transmission resource pool that is the same as the transmission resource pool for transmission of the request. For example, a reception resource pool for reception of the request may be configured the same as a reception resource pool for reception of the inter-UE coordination information.

According to an embodiment, the inter-UE coordination information may be transmitted based on detailed information included in the request. For example, the inter-UE coordination information may be transmitted based on a priority value equal to a priority value included in the request.

According to an embodiment, the format of the first SCI may be the same as the format of the second SCI. For example, the format of the first SCI and the format of the second SCI may be based on any one of existing second stage SCI formats (e.g., SCI format 2-A or SCI format 2-B). For example, the format of the first SCI and the format of the second SCI may be based on a second stage SCI format (e.g., SCI format 2-C) different from the existing second stage SCI format.

According to an embodiment, the inter-UE coordination information may be transmitted based on a second SCI (second second stage SCI). Specifically, the second SCI may be transmitted based on a second PSSCH scheduled by a first stage SCI related to the second PSCCH. In this case, the first stage SCI related to the second PSCCH may include a field (e.g., second-stage SCI format field) indicating the format of the second SCI.

According to the step S1420, an operation of the first UE (100/200 of FIGS. 16 to 21) to transmit the inter-UE coordination information to the second UE (100/200 of FIGS. 16 to 21) may be implemented by a device of FIGS. 16 to 21. For example, referring to FIG. 17, one or more processors 102 may control one or more transceivers 106 and/or one or more memories 104 so as to transmit the inter-UE coordination information to the second UE 200.

Although not shown in the figure, the first UE may perform operations according to S1410 and S1420 based on the following 1) to 4).
1) First PSCCH reception
2) The first PSSCH scheduled by the first SCI (SCI format 1-A) related to the first PSCCH is received (S1410). That is, the first SCI (first second stage SCI) including a request for inter-UE coordination information is received based on the first PSSCH.
3) Second PSCCH transmission
4) The second PSSCH scheduled by the first stage SCI (SCI format 1-A) related to the second PSCCH is transmitted (S1420). That is, the second SCI (second second stage SCI) including the inter-UE coordination information is transmitted based on the second PSSCH.

Hereinafter, the above-described embodiments are described in detail from a perspective of the operation of the second UE with reference to FIG. 15. Methods to be described below are merely distinguished for convenience of explanation. Thus, as long as the methods are not mutually exclusive, it is obvious that configuration of any method can be substituted or combined with configuration of another method.

Figure 15:
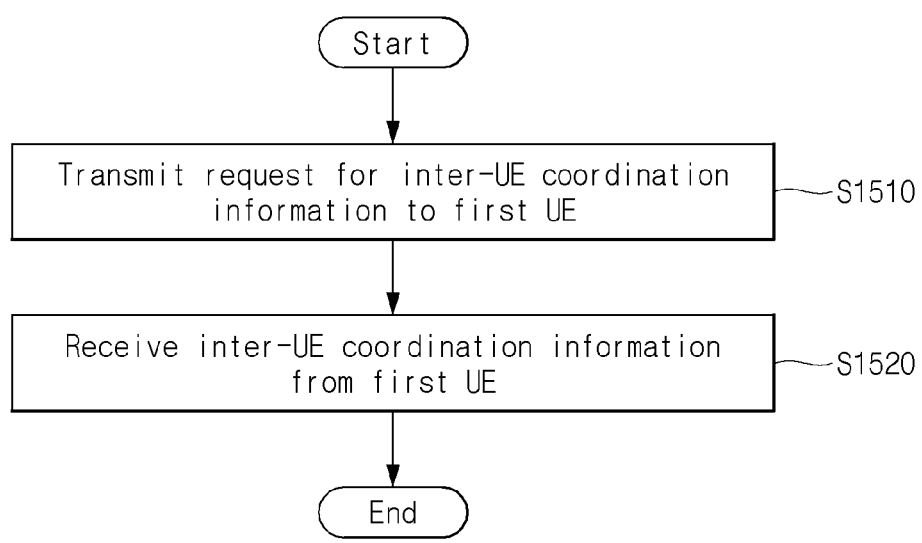
FIG. 15 is a flow chart illustrating a method of receiving, by a second UE, inter-UE coordination information in a wireless communication system according to another embodiment of the present disclosure.

FIG. 15 is a flow chart illustrating a method of receiving, by a second UE, inter-UE coordination information in a wireless communication system according to another embodiment of the present disclosure.

Referring to FIG. 15, a method of receiving inter-UE coordination information by the second UE in a wireless communication system according to another embodiment of the present disclosure may include transmitting a request for inter-UE coordination information to the first UE (S1510) and receiving the inter-UE coordination information from the first UE (S1520).

In S1510, the second UE transmits the request for inter-UE coordination information to the first UE. For example, the second UE may transmit first sidelink control information (SCI) including the request for inter-UE coordination information to the first UE. The first UE may be based on the above-described UE-A that transmits assistance information/additional information/inter-UE coordination information. The second UE may be based on the above-described UE-B that transmits a request for assistance information/additional information/inter-UE coordination information.

A transmission of the request may be triggered based on a pre-configured condition in order to minimize a degree of congestion caused by signaling of request-based inter-UE coordination information. This is described in detail below. For example, the pre-configured condition may be based on pre-configured higher layer parameter sl-TriggerCondition-Request.

According to an embodiment, the request may be transmitted based on a presence of data transmitted by the second UE (e.g., when a value of sl-TriggerConditionRequest is set to 1). Based on that the second UE has first data to be transmitted to the first UE, the request may be transmitted based on a medium access control-control element (MAC-CE) and/or second sidelink control information (SCI). For example, when the value of sl-TriggerConditionRequest is set to 0, conditions under which the request is transmitted may vary based on an implementation of the second UE (UE-B).

As above, the request may be transmitted limitedly only when the second UE has data to be transmitted to the first UE. Thus, the degree of congestion caused by signaling of the request-based inter-UE coordination information can be minimized.

For example, the request may be transmitted based on the MAC-CE. For example, the request may be transmitted based on the MAC-CE and the second SCI (second stage SCI). The MAC-CE and the second SCI may mean a container for delivering information related to the request for inter-UE coordination information. That is, the information related to the request for inter-UE coordination information may be included in the MAC-CE (e.g., Inter-UE Coordination Request MAC-CE) and/or the second SCI (e.g., SCI format 2-C) and may be transmitted from the second UE to the first UE.

For example, the MAC-CE and/or the second SCI (second stage SCI) may be used as the container for the request based on RRC configuration for sidelink communication. As a detailed example, the use of the second SCI as the container may be enabled or disabled based on the RRC configuration. For example, the higher layer parameter sl-ContainerRequest may be configured to be enabled or disabled.

Based on the sl-ContainerRequest being configured to be enabled, the second SCI in addition to the MAC-CE may be additionally used as the container for the request. For example, based on latency requirements for sidelink communication being tight (e.g., based on the latency requirements being less than or equal to a pre-defined value), the sl-ContainerRequest may be configured to be enabled. That is, when a low latency is required, the second SCI transmitted based on L1 ID (Layer 1 ID) may be additionally utilized for faster processing. In this instance, the request may be included in each of the MAC-CE and the second SCI (second stage SCI) and may be transmitted from the second UE to the first UE. The MAC-CE may be transmitted based on L2 ID (Layer 2 ID), and the second SCI may be transmitted based on L1 ID (Layer 1 ID). In this case, the following operation may be considered. The first UE receiving the request included in the second SCI may first transmit the inter-UE coordination information to the second UE, and when the L2 ID obtained from the MAC-CE is different from L2 ID of the first UE, transmission of the inter-UE coordination information may stop. Based on the number of bits of the L1 ID being different from the number of bits of the L2 ID, two or more L2 IDs corresponding to one L1 ID may be present (e.g., the number of bits of L1 ID<the number of bits of L2 ID). On the contrary, two or more L1 IDs corresponding to one L2 ID may be present (e.g., the number of bits of L1 ID>the number of bits of L2 ID). The first UE may transmit the inter-UE coordination information to the second UE only when the L1 ID included in the second SCI and the L2 ID included in the MAC-CE are identical to an ID of the first UE. Reliability of the signaling of the request-based inter-UE coordination information can be improved compared to when the request for inter-UE coordination information is transmitted only via the second SCI as described above.

Based on the sl-ContainerRequest being configured to be disabled, the MAC-CE may be used as the container for the request. For example, when the low latency is not required (e.g., based on the latency requirements being greater than the pre-defined value), the sl-ContainerRequest may be configured to be disabled. In this instance, the request may be included in the MAC-CE and may be transmitted from the second UE to the first UE.

The latency requirements are merely one example of the configuration of the container for the request. That is, the RRC configuration (e.g., configuration of sl-ContainerRequest) related to the utilization of the MAC-CE and/or the second SCI may be performed based on other requirements for sidelink communication (e.g., requirements other than latency or one or more requirements including latency). For example, based on requirements other than the latency, the sl-ContainerRequest may be configured to be enabled or disabled. For example, based on a combination of one or more requirements including the latency, the sl-ContainerRequest may be configured to be enabled or disabled.

The first data and the request may be transmitted based on a physical sidelink shared channel (PSSCH). The first data and the request may be multiplexed and transmitted. That is, the request may be transmitted by being multiplexed with the first data in which a SOURCE ID and a DESTINATION ID are the same. The multiplexing may be based on at least one of time division multiplexing (TDM), frequency division multiplexing (FDM), code division multiplexing (CDM), or joint-encoding.

According to an embodiment, the first SCI (i.e., second stage SCI including the request) may include detailed information related to the inter-UE coordination information. The detailed information may include information related to at least one of i) a priority, ii) a resource selection window, iii) a number of subchannels and iv) a type of resource.

Information related to the priority may be a priority value for the request (or a priority value for transmission of the request). For example, the information related to the priority may be based on a priority field of the second SCI (SCI format 2-C). For example, the information related to the priority may be based on a priority field of MAC-CE (Inter-UE Coordination Request MAC CE).

Information related to the resource selection window may represent a location of a window for generating the inter-UE coordination information. The first UE may generate the inter-UE coordination information based on a resource within the resource selection window. More specifically, the first UE may determine the resource within the resource selection window as a preferred resource or a non-preferred resource. The inter-UE coordination information may include information related to the preferred resource or the non-preferred resource. For example, the information related to the resource selection window may be based on a resource selection window location field of the second SCI (SCI format 2-C). For example, the information related to the resource selection window may be based on an RSWL field of MAC-CE (Inter-UE Coordination Request MAC CE).

Information related to the number of subchannels may mean a number of subchannels to be used for transmission of a physical sidelink control channel (PSCCH) and a physical sidelink shared channel (PSSCH). The number of subchannels may be included when a type of resource related to the inter-UE coordination information is the preferred resource. For example, the information related to the number of subchannels may be based on a field of the number of subchannels of the second SCI (SCI format 2-C). For example, the information related to the number of subchannels may be based on the field of the number of subchannels of MAC-CE (Inter-UE Coordination Request MAC CE).

Information related to the type of resource may be information representing a type of resource determined in the resource selection window. Specifically, the type of resource may be based on the preferred resource or the non-preferred resource. For example, the information related to the type of resource may be based on a resource set type field of the second SCI (SCI format 2-C). For example, the information related to the type of resource may be based on an RT field of MAC-CE (Inter-UE Coordination Request MAC CE).

According to an embodiment, the request may be transmitted based on first SCI (first second stage SCI). Specifically, the first SCI may be transmitted based on a first physical sidelink shared channel (PSSCH) scheduled by a first stage SCI related to a first physical sidelink control channel (PSCCH). In this case, the first stage SCI related to the first PSCCH may include a field (e.g., second-stage SCI format field) indicating a format of the first SCI.

According to the step S1510, an operation of the second UE (100/200 of FIGS. 16 to 21) to transmit a request for inter-UE coordination information to the first UE (100/200 of FIGS. 16 to 21) may be implemented by a device of FIGS. 16 to 21. For example, referring to FIG. 17, one or more processors 202 may control one or more transceivers 206 and/or one or more memories 204 so as to transmit the request for inter-UE coordination information to the first UE 100.

In S1520, the second UE receives the inter-UE coordination information from the first UE. For example, the second UE may receive second SCI including the inter-UE coordination information to the first UE. Here, the inter-UE coordination information may be received by being triggered by i) the aforementioned request or ii) a condition other than the request.

When the inter-UE coordination information is triggered by conditions other than the request, the inter-UE coordination information may be received based on a pre-configured condition in order to minimize a degree of congestion. For example, the pre-configured condition may be based on a higher layer parameter sl-TriggerConditionCoordInfo.

According to an embodiment, based on the inter-UE coordination information being triggered by conditions other than the request, the inter-UE coordination information may be received based on a presence of data transmitted by the first UE. Specifically, based on that the first UE has second data to be transmitted to the second UE, the inter-UE coordination information may be received based on MAC-CE and/or a second SCI (e.g., when a value of sl-TriggerConditionCoordInfo is set to 1). For example, when the value of sl-TriggerConditionCoordInfo is set to 0, conditions for reception of the inter-UE coordination information may vary based on an implementation of the first UE (UE-A).

When the inter-UE coordination information is triggered by conditions other than the request as described above, the inter-UE coordination information is transmitted limitedly only when the first UE has data to be transmitted to the second UE. Thus, the degree of congestion caused by signaling of the inter-UE coordination information triggered by conditions other than the request can be minimized.

The second data and the inter-UE coordination information may be received based on a physical sidelink shared channel (PSSCH). The second data and the inter-UE coordination information may be received together. Specifically, the second data and the inter-UE coordination information may be multiplexed and received. That is, the inter-UE coordination information may be received by being multiplexed with the second data in which a SOURCE ID and a DESTINATION ID are the same. The multiplexing may be based on at least one of time division multiplexing (TDM), frequency division multiplexing (FDM), code division multiplexing (CDM), or joint-encoding.

According to an embodiment, the inter-UE coordination information may be received based on MAC-CE and/or a second SCI. For example, the inter-UE coordination information may be received based on the MAC-CE. For example, the inter-UE coordination information may be received based on the MAC-CE and the second SCI (second stage SCI). The MAC-CE and the second SCI may mean a container for delivering the inter-UE coordination information. That is, the inter-UE coordination information may be included in the MAC-CE (e.g., Inter-UE Coordination Information MAC-CE) and/or the second SCI (e.g., SCI format 2-C) and may be transmitted from the first UE to the second UE.

Based on the number of resource combinations related to the inter-UE coordination information, the inter-UE coordination information may be received based on i) the MAC-CE or ii) the MAC-CE and the second SCI.

Based on the number of resource combinations related to the inter-UE coordination information being greater than a predefined value (e.g., 3), the inter-UE coordination information may be received based on the MAC-CE.

Based on the number of resource combinations related to the inter-UE coordination information being less than or equal to the predefined value, the inter-UE coordination information may be received based on i) the MAC-CE or ii) the MAC-CE and the second SCI.

The resource combination means a combination including a time resource indicator value (TRIV), a frequency resource indicator value (FRIV), and a resource reservation period P. The number of resource combinations may be indicated based on a resource combination field of the second SCI.

According to an embodiment, the inter-UE coordination information may be received within a predefined time. Specifically, the inter-UE coordination information may be received within the predefined time from a time at which the inter-UE coordination information is triggered (by the request or conditions other than the request). The predefined time may be determined based on a packet delay budget (PDB). For example, the PDB may be configured/determined based on a time at which the request is transmitted. For example, the PDB may be configured/determined based on a time at which the inter-UE coordination information is triggered by conditions other than the request. For example, information related to the PDB may be pre-configured. For example, the information related to the PDB may be included in the request. The information related to the PDB may be based on an embodiment related to PDB information about the assistance information described above.

According to an embodiment, a first payload size of first SCI may be the same as a second payload size of second SCI based on based on the first SCI being transmitted on a first physical sidelink shared channel (PSSCH) and the second SCI being transmitted on a second PSSCH.

The above-described embodiments related to the first/second payload sizes may be applied only when resource pools are the same. That is, based on the fact that the first PSSCH (first SCI) and the second PSSCH (second SCI) are transmitted based on the same resource pool, the first payload size of the first SCI may be the same as the second payload size of the second SCI. The same resource pool may mean that a transmission and/or reception resource pool of the first UE is the same as a transmission and/or reception resource pool of the second UE. For example, the same resource pool may mean that a transmission resource pool for transmission of the first PSSCH (first SCI) is the same as a transmission resource pool for transmission of the second PSSCH (second SCI). For example, the same resource pool may mean that a reception resource pool for reception of the first PSSCH (first SCI) is the same as a reception resource pool for reception of the second PSSCH (second SCI). For example, the same resource pool may mean that a transmission resource pool for transmission of the first PSSCH (first SCI) is the same as a reception resource pool for reception of the second PSSCH (second SCI). For example, the same resource pool may mean that a reception resource pool for reception of the first PSSCH (first SCI) is the same as a transmission resource pool for transmission of the second PSSCH (second SCI).

According to an embodiment, the first payload size of the first SCI may be the same as the second payload size of the second SCI based on the first SCI being transmitted on the first PSSCH and the second SCI being transmitted on the second PSSCH same in the same resource pool.

Here, the first SCI (e.g., first second stage SCI) and the second SCI (e.g., second second stage SCI) may include an indicator (e.g., providing/requesting indicator field) indicating the request or the inter-UE coordination information. Specifically, the indicator of the first SCI may be set to a value indicating the request. The indicator of the second SCI may be set to a value representing the inter-UE coordination information.

As an example, the indicator (e.g., providing/requesting indicator field) included in the first second stage SCI transmitted by the second UE may indicate a request for inter-UE coordination information. The indicator (e.g., providing/requesting indicator field) included in the second second stage SCI transmitted by the first UE may indicate inter-UE coordination information.

The embodiment related to the first/second payload sizes may be based on the above-described embodiment related to the size of the second SCI corresponding to additional information/request for additional information.

Based on appending of padding bits, the first payload size and the second payload size may be set to be identical. That is, the padding bits may be used to adjust second SCI format sizes to one size. It will be described in detail below.

The padding bits may be appended based on the first payload size or the second payload size. For example, the padding bits may be appended to the first SCI based on the second payload size. For example, the padding bits may be appended to the second SCI based on the first payload size.

The padding bits may be based on a bit set to a specific value. For example, the padding bits may be based on a bit set to 0 (e.g., "000" for 3 bits). For example, the padding bits may be based on a bit set to 1 (e.g., "111" for 3 bits).

According to an embodiment, a resource pool related to the request may be the same as a resource pool related to the inter-UE coordination information. For example, a resource pool to which a preferred resource or a non-preferred resource related to the request belongs may be the same as a resource pool to which a preferred resource or a non-preferred resource related to the inter-UE coordination information belongs. For example, a resource pool related to transmission of the request may be the same as a resource pool for receiving inter-UE coordination information. Specifically, a transmission resource pool for transmission of the inter-UE coordination information may be configured the same as a transmission resource pool for transmission of the request. That is, the inter-UE coordination information may be transmitted based on a transmission resource pool that is the same as the transmission resource pool for transmission of the request. For example, a reception resource pool for reception of the request may be configured the same as a reception resource pool for reception of the inter-UE coordination information.

According to an embodiment, the inter-UE coordination information may be transmitted based on detailed information included in the request. For example, the inter-UE coordination information may be received based on a priority value equal to a priority value included in the request.

According to an embodiment, the format of the first SCI may be the same as the format of the second SCI. For example, the format of the first SCI and the format of the second SCI may be based on any one of existing second stage SCI formats (e.g., SCI format 2-A or SCI format 2-B). For example, the format of the first SCI and the format of the second SCI may be based on a second stage SCI format (e.g., SCI format 2-C) different from the existing second stage SCI format.

According to an embodiment, the inter-UE coordination information may be received based on a second SCI (second second stage SCI). Specifically, the second SCI may be received based on a second PSSCH scheduled by a first stage SCI related to a second PSCCH. In this case, the first stage SCI related to the second PSCCH may include a field (e.g., second-stage SCI format field) indicating the format of the second SCI.

According to the step S1520, an operation of the second UE (100/200 of FIGS. 16 to 21) to receive the inter-UE coordination information from the first UE (100/200 of FIGS. 16 to 21) may be implemented by a device of FIGS. 16 to 21. For example, referring to FIG. 17, one or more processors 202 may control one or more transceivers 206 and/or one or more memories 204 so as to receive the inter-UE coordination information from the first UE 100.

Although not shown in the figure, the second UE may perform operations according to S1510 and S1520 based on the following 1) to 4).

1) First PSCCH transmission
2) The first PSSCH scheduled by the first SCI (SCI format 1-A) related to the first PSCCH is transmitted (S1510). That is, the first SCI (first second stage SCI) including a request for inter-UE coordination information is transmitted based on the first PSSCH.
3) Second PSCCH reception
4) The second PSSCH scheduled by the first stage SCI (SCI format 1-A) related to the second PSCCH is received (S1520). That is, the second SCI (second second stage SCI) including the inter-UE coordination information is received based on the second PSSCH.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
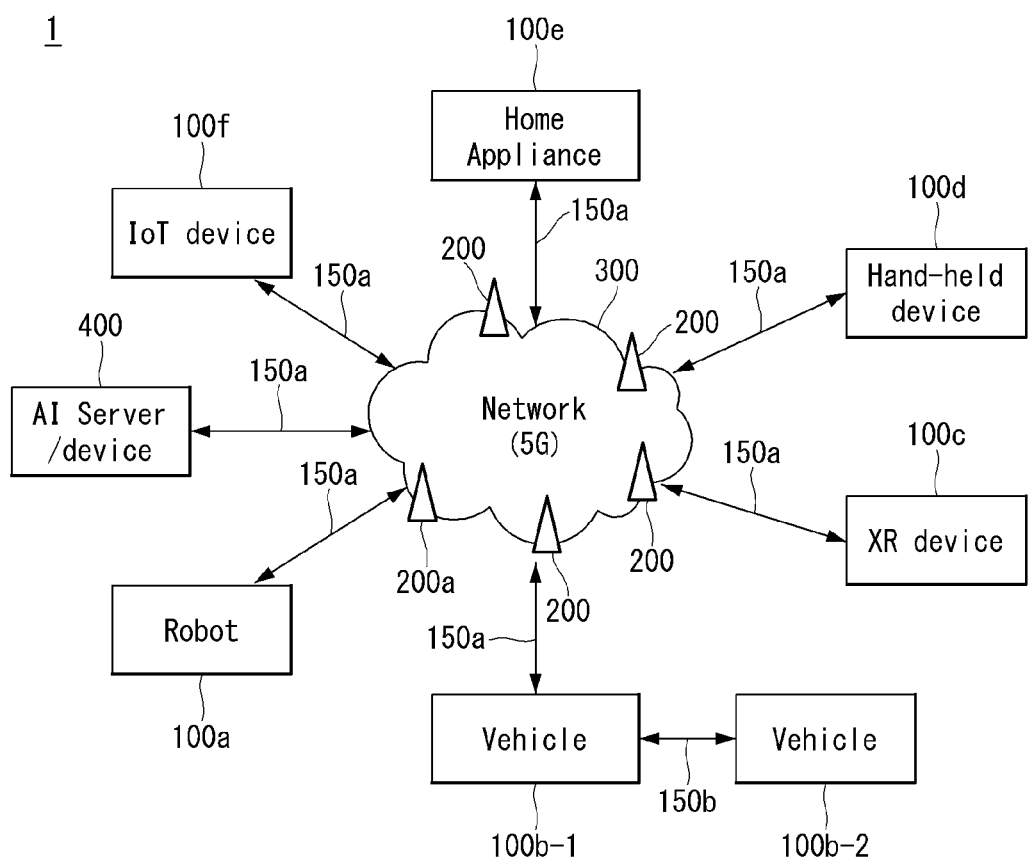
FIG. 16 shows a communication system 1 based on an embodiment of the present disclosure.

FIG. 16 shows a communication system 1 based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 17 shows wireless devices based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) based on the descriptions, functions, procedures, proposals, methods, and/or operational flowcharts disclosed in this document. The one or more processors 102 and 202 may generate messages, control information, data, or information based on the descriptions, functions, procedures, proposals, methods, and/or operational flowcharts disclosed in this document. The one or more processors 102 and 202 may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information based on the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
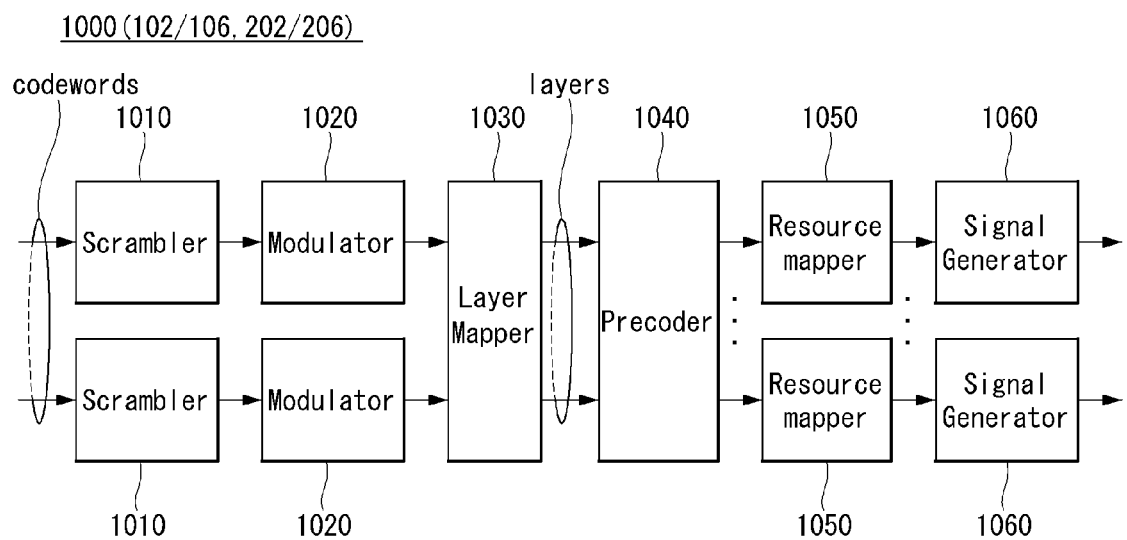
FIG. 18 shows a signal process circuit for a transmission signal based on an embodiment of the present disclosure.

FIG. 18 shows a signal process circuit for a transmission signal based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
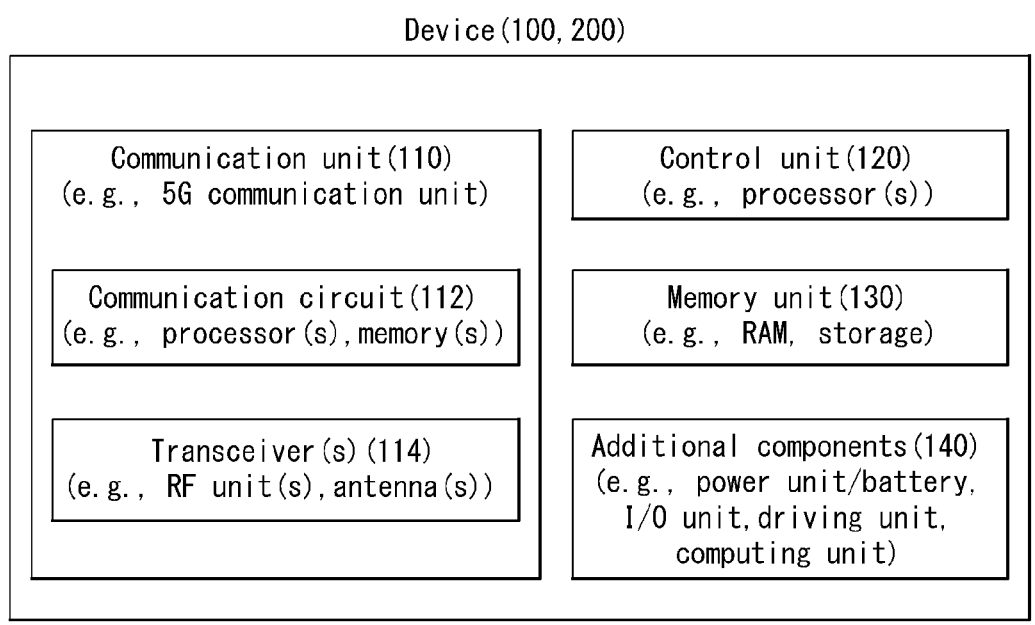
FIG. 19 shows another example of a wireless device based on an embodiment of the present disclosure.

FIG. 19 shows another example of a wireless device based on an embodiment of the present disclosure. The wireless device may be implemented in various forms based on a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place based on a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
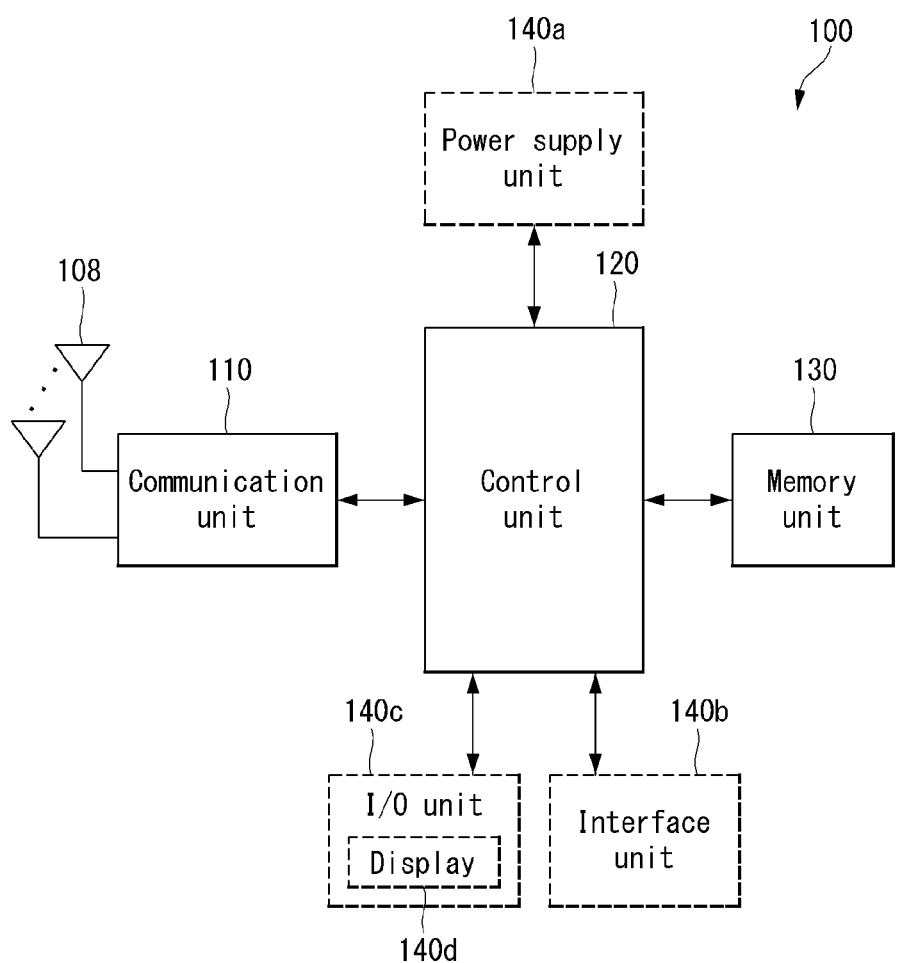
FIG. 20 shows a hand-held device based on an embodiment of the present disclosure.

FIG. 20 shows a hand-held device based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 21:
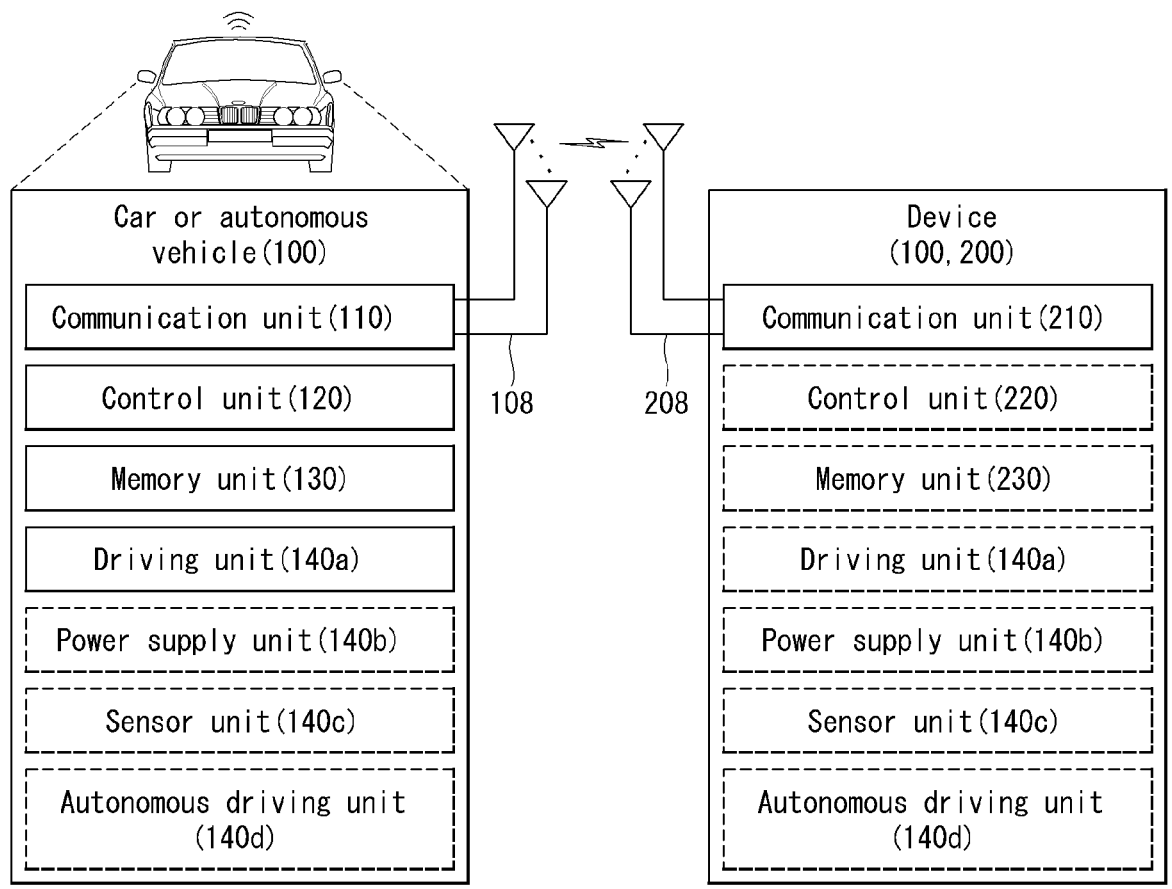
FIG. 21 shows a vehicle or an autonomous vehicle based on an embodiment of the present disclosure.

FIG. 21 shows a vehicle or an autonomous vehicle based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path based on the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method of a first User Equipment (UE) for transmitting an Inter-UE coordination information in a wireless communication system, the method comprising:
receiving, from a second UE, a first Sidelink Control Information (SCI) including a request for an Inter-UE Coordination information; and
transmitting, to the second UE, a second SCI including the Inter-UE Coordination information,
wherein, based on the first SCI being transmitted on a first Physical Sidelink Shared Channel (PSSCH) and the second SCI being transmitted on a second PSSCH, in a same resource pool, a first payload size of the first SCI and a second payload size of the second SCI are same.

2. The method of claim 1, wherein, based on appending of padding bits, the first payload size and the second payload size are set to be the same.

3. The method of claim 2, wherein the padding bits are appended based on the first payload size or the second payload size.

4. The method of claim 3, wherein the padding bits are appended to the first SCI based on the second payload size.

5. The method of claim 3, wherein the padding bits are appended to the second SCI based on the first payload size.

6. The method of claim 2, wherein the padding bits are based on a bit set to zero.

7. The method of claim 1, wherein the first SCI includes detailed information related to the inter-UE coordination information, and the detailed information includes information related to at least one of i) priority, ii) a resource selection window, iii) a number of subchannels, and iv) a resource type.

8. The method of claim 7, wherein the resource type is based on a preferred resource or a non-preferred resource.

9. The method of claim 1, wherein a resource pool related to the request and a resource pool related to the inter-UE coordination information are same.

10. The method of claim 9, wherein a resource pool to which a preferred resource or a non-preferred resource related to the request belongs and a resource pool to which a preferred resource or a non-preferred resource related to the inter-UE coordination information belongs are same.

11. The method of claim 1, wherein a format of the first SCI and a format of the second SCI are same.

12. The method of claim 1, wherein the first SCI is received based on the first PSSCH scheduled by a first stage SCI related to a first physical sidelink control channel (PSCCH), and the second SCI is transmitted based on the second PSSCH scheduled by a first stage SCI related to a second PSCCH.

13. A first UE transmitting inter-UE coordination information in a wireless communication system, comprising:
one or more transceivers;
one or more processors configured to control the one or more transceivers; and
one or more memories operably connected to the one or more processors,
wherein the one or more memories store instructions for performing operations, based on being executed by the one or more processors, and
the operations comprise:
receiving, from a second UE, a first Sidelink Control Information (SCI) including a request for an Inter-UE Coordination information; and
transmitting, to the second UE, a second SCI including the Inter-UE Coordination information,
wherein, based on the first SCI being transmitted on a first Physical Sidelink Shared Channel (PSSCH) and the second SCI being transmitted on a second PSSCH, in a same resource pool, a first payload size of the first SCI and a second payload size of the second SCI are same.

14. A device for controlling a first UE to transmit inter-UE coordination information in a wireless communication system, comprising:
one or more processors; and
one or more memories operably connected to the one or more processors,
wherein the one or more memories store instructions for performing operations, based on being executed by the one or more processors, and
the operations comprise:
receiving, from a second UE, a first Sidelink Control Information (SCI) including a request for an Inter-UE Coordination information; and
transmitting, to the second UE, a second SCI including the Inter-UE Coordination information,
wherein, based on the first SCI being transmitted on a first Physical Sidelink Shared Channel (PSSCH) and the second SCI being transmitted on a second PSSCH, in a same resource pool, a first payload size of the first SCI and a second payload size of the second SCI are same.

15. One or more non-transitory computer-readable media storing one or more instructions, wherein the one or more instructions perform operations based on being executed by one or more processors, and the operations comprise:

receiving, from a second UE, a first Sidelink Control Information (SCI) including a request for an Inter-UE Coordination information; and transmitting, to the second UE, a second SCI including the Inter-UE Coordination information, wherein, based on the first SCI being transmitted on a first Physical Sidelink Shared Channel (PSSCH) and the second SCI being transmitted on a second PSSCH, in a same resource pool, a first payload size of the first SCI and a second payload size of the second SCI are same.

16. A method of a second User Equipment (UE) for receiving an Inter-UE Coordination information in a wireless communication system, the method comprising:

transmitting, to a first UE, a first Sidelink Control Information (SCI) including a request for an Inter-UE Coordination information, receiving, from the first UE, a second SCI including the Inter-UE Coordination information, wherein, based on the first SCI being transmitted on a first Physical Sidelink Shared Channel (PSSCH) and the second SCI being transmitted on a second PSSCH, in a same resource pool, a first payload size of the first SCI and a second payload size of the second SCI are same.

17. A second UE receiving inter-UE coordination information in a wireless communication system, comprising:

one or more transceivers;

one or more processors configured to control the one or more transceivers; and one or more memories operably connected to the one or more processors, wherein the one or more memories store instructions for performing operations based on being executed by the one or more processors, and the operations comprise:

transmitting, to a first UE, a first Sidelink Control Information (SCI) including a request for an Inter-UE Coordination information; and receiving, from the first UE, a second SCI including the Inter-UE Coordination information, wherein, based on the first SCI being transmitted on a first Physical Sidelink Shared Channel (PSSCH) and the second SCI being transmitted on a second PSSCH, in a same resource pool, a first payload size of the first SCI and a second payload size of the second SCI are same.

* * * * *